United States Patent
Park et al.

(10) Patent No.: US 9,572,148 B2
(45) Date of Patent: Feb. 14, 2017

(54) METHOD AND APPARATUS FOR TRANSCEIVING A DOWNLINK CONTROL CHANNEL IN A WIRELESS COMMUNICATION SYSTEM

(71) Applicant: LG ELECTRONICS INC., Seoul (KR)

(72) Inventors: Sungho Park, Anyang-si (KR); Jinyoung Chun, Anyang-si (KR); Kitae Kim, Anyang-si (KR); Sunam Kim, Anyang-si (KR); Jiwon Kang, Anyang-si (KR); Binchul Ihm, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 14/359,004

(22) PCT Filed: Dec. 7, 2012

(86) PCT No.: PCT/KR2012/010618
§ 371 (c)(1),
(2) Date: May 16, 2014

(87) PCT Pub. No.: WO2013/085335
PCT Pub. Date: Jun. 13, 2013

(65) Prior Publication Data
US 2014/0328302 A1  Nov. 6, 2014

Related U.S. Application Data

(60) Provisional application No. 61/568,105, filed on Dec. 7, 2011.

(51) Int. Cl.
*H04L 5/00* (2006.01)
*H04W 72/04* (2009.01)
*H04W 72/08* (2009.01)

(52) U.S. Cl.
CPC ............ *H04W 72/042* (2013.01); *H04L 5/006* (2013.01); *H04L 5/0037* (2013.01); *H04L 5/0053* (2013.01);
(Continued)

(58) Field of Classification Search
CPC ...... H04L 5/0037; H04L 5/006; H04L 5/0053; H04W 72/08; H04W 72/042
See application file for complete search history.

(56) References Cited

U.S. PATENT DOCUMENTS 9,084,238 B2 * 7/2015 Gao
2011/0170496 A1 * 7/2011 Fong ..................... H04L 5/0053
370/329

(Continued)

FOREIGN PATENT DOCUMENTS

KR  10-2010-0099655  9/2010
KR  10-2011-0084976  7/2011

(Continued)

OTHER PUBLICATIONS

PCT International Application No. PCT/KR2012/010618, International Search Report, dated Apr. 16, 2013, 19 pages.

(Continued)

*Primary Examiner* — Charles C Jiang
*Assistant Examiner* — Kyaw Z Soe
(74) *Attorney, Agent, or Firm* — Lee, Hong, Degerman, Kang & Waimey

(57) ABSTRACT

The present invention relates to a wireless communication system, and more particularly, to a method and apparatus for transceiving a downlink control channel. According to one embodiment of the present invention, method in which a base station transmits downlink control information in a wireless communication system comprises: a step for determining an allocatable resource region for an enhanced (Continued)

physical downlink control channel (E-PDCCH) of a local allocation system; a step for allocating an E-PDCCH to the determined allocatable resource region for the E-PDCCH; and a step for transmitting the downlink control information on the allocated E-PDCCH. The allocatable resource region for the E-PDCCH can be set as a group of partial resource regions in each of a plurality of partitions when a downlink system bandwidth contains said plurality of partitions.

20 Claims, 13 Drawing Sheets

(52) U.S. Cl.
CPC .............. *H04W 72/08* (2013.01); *H04L 5/001* (2013.01); *H04L 5/0023* (2013.01)

(56) References Cited

U.S. PATENT DOCUMENTS

| | | | | |
|---|---|---|---|---|
| 2011/0274066 | A1* | 11/2011 | Tee | H04L 5/001 370/329 |
| 2012/0106465 | A1* | 5/2012 | Haghighat | H04W 72/1289 370/329 |
| 2013/0044693 | A1* | 2/2013 | Lindh | H04L 5/0026 370/329 |
| 2013/0064196 | A1* | 3/2013 | Gao | H04L 5/0016 370/329 |
| 2013/0083769 | A1* | 4/2013 | Qu | H04L 5/0016 370/330 |
| 2013/0107816 | A1* | 5/2013 | Iraji | H04W 72/042 370/329 |
| 2013/0107861 | A1* | 5/2013 | Cheng | H04W 72/042 370/331 |
| 2013/0223402 | A1* | 8/2013 | Feng | H04L 5/0007 370/330 |

FOREIGN PATENT DOCUMENTS

| | | |
|---|---|---|
| KR | 10-2011-0112750 | 10/2011 |
| KR | 10-2011-0120498 | 11/2011 |
| KR | 10-2011-0121549 | 11/2011 |
| WO | 2011/037439 | 3/2011 |
| WO | 2011/085195 | 7/2011 |
| WO | 2011/137383 | 11/2011 |
| WO | 2011/140139 | 11/2011 |

OTHER PUBLICATIONS

PCT International Application No. PCT/KR2012/010618, International Search Report, dated Apr. 16, 2013, 15 pages.

LG-Ericsson, "Consideration on E-PDCCH multiplexing and signalling", R1-113372, 3GPP TSG RAN WG1 #66bis, Oct. 2011, 3 pages.

* cited by examiner

METHOD AND APPARATUS FOR TRANSCEIVING A DOWNLINK CONTROL CHANNEL IN A WIRELESS COMMUNICATION SYSTEM

CROSS-REFERENCE TO RELATED APPLICATIONS

This application is the National Stage filing under 35 U.S.C. 371 of International Application No. PCT/KR2012/010618, filed on Dec. 7, 2012, which claims the benefit of U.S. Provisional Application Ser. No. 61/568,105, filed on Dec. 7, 2011, the contents of which are all hereby incorporated by reference herein in their entirety.

TECHNICAL FIELD

The following description relates to a wireless communication system and, more particularly, to a method and apparatus for transmitting and receiving a downlink control channel in a wireless communication system.

BACKGROUND ART

In a conventional wireless communication system, an eNB can provide scheduling information for uplink transmission and/or downlink reception of user equipment (UE) through a physical downlink control channel (PDCCH) to the UE. Resources through which a downlink control channel such as the PDCCH can be transmitted are limited to a specific region in the conventional wireless communication system.

There are demands for support of increased transmission capacity, improvement of inter-cell interference coordination, support of coordinated multi-point (CoMP) and multi-user multiple input multiple output (MU-MIMO), etc. However, restrictions on locations of downlink control channel transmission resources in the conventional wireless communication system may not satisfy the above-described demands. Accordingly, introduction of a new downlink control channel, transmitted in a physical resource region different from a downlink control channel transmission region defined in the conventional wireless communication system, is under discussion.

DISCLOSURE

Technical Problem

An object of the present invention devised to solve the problem lies in a method for setting a transmission resource for efficiently transmitting a new downlink control channel. Another object of the present invention is to provide a method for reducing overhead of blind decoding of the new downlink control channel, performed by a UE. In addition, another object of the present invention is to provide a method for determining a resource to which the new downlink control channel is allocated for link quality improvement.

The technical problems solved by the present invention are not limited to the above technical problems and those skilled in the art may understand other technical problems from the following description.

Technical Solution

The object of the present invention can be achieved by providing a method for transmitting, by an eNB, downlink control information in a wireless communication system, the method including: determining a localized enhanced physical downlink control channel (E-PDCCH) allocatable resource region; allocating an E-PDCCH to the determined E-PDCCH allocatable resource region; and transmitting the downlink control information on the allocated E-PDCCH, wherein, when a downlink system bandwidth includes a plurality of partitions, the E-PDCCH allocatable resource region is set as a group of partial resource regions in the respective partitions.

In another embodiment of the present invention, provided herein is a method for receiving, by a UE, downlink control information in a wireless communication system, the method including: determining a localized E-PDCCH allocatable resource region; attempting to decode an E-PDCCH for the UE in the determined E-PDCCH allocatable resource region; and receiving the downlink control information transmitted on the E-PDCCH when the E-PDCCH has been successfully decoded, wherein, when a downlink system bandwidth includes a plurality of partitions, the E-PDCCH allocatable resource region is set as a group of partial resource regions in the respective partitions.

In another embodiment of the present invention, provided herein is an eNB transmitting downlink control information in a wireless communication system, including: a reception module; a transmission module; and a processor, wherein the processor is configured to determine a localized E-PDCCH allocatable resource region, to allocate an E-PDCCH to the determined E-PDCCH allocatable resource region and to transmit the downlink control information on the allocated E-PDCCH through the transmission module, wherein, when a downlink system bandwidth includes a plurality of partitions, the E-PDCCH allocatable resource region is set as a group of partial resource regions in the respective partitions.

In another embodiment of the present invention, provided herein is a UE receiving downlink control information in a wireless communication system, including: a reception module; a transmission module; and a processor, wherein the processor is configured to determine a localized E-PDCCH allocatable resource region, to attempt to decode an E-PDCCH for the UE in the determined E-PDCCH allocatable resource region and to receive the downlink control information transmitted on the E-PDCCH when the E-PDCCH has been successfully decoded, wherein, when a downlink system bandwidth includes a plurality of partitions, the E-PDCCH allocatable resource region is set as a group of partial resource regions in the respective partitions.

The following may be commonly applied to the above-described embodiments of the present invention.

The group of partial resource regions may be determined according to predetermined priority of the plurality of partitions.

The predetermined priority may be set according to channel quality with respect to the plurality of partitions.

A partition having higher channel quality than other partitions may be given higher priority.

The plurality of partitions may correspond to a plurality of subbands and one subband may include a plurality of resource blocks.

The group of partial resource regions may include resource blocks having the lowest indexes in the respective subbands.

Each of a plurality of resource blocks belonging to the E-PDCCH allocatable resource region may include a plurality of enhanced-control channel elements (E-CCEs).

The E-PDCCH allocatable resource region may be set to preferentially include E-CCEs belonging to a subband having high channel quality.

An aggregation level for an E-PDCCH allocated according to localized allocation may be set to a value lower than an aggregation level for an E-PDCCH allocated according to distributed allocation.

The aggregation level for the E-PDCCH allocated according to localized allocation may have a value of 1, 2 or 4 and the aggregation level for the E-PDCCH allocated according to distributed allocation may have a value of 1, 2, 4 or 8.

At least one of configuration information about the plurality of partitions and configuration information about the group of partial resource regions may be provided to a receiving end receiving the E-PDCCH through higher layer signaling.

The E-PDCCH may be disposed on orthogonal frequency division multiplex (OFDM) symbols other than first N (N≤4) OFDM symbols in a downlink subframe.

The above description and the following detailed description of the present invention are exemplary and are for additional explanation of the invention disclosed in the claims.

Advantageous Effects

According to the present invention, it is possible to provide a method for setting a transmission resource for efficiently transmitting a new downlink control channel. In addition, it is possible to provide a method for reducing overhead of blind decoding of the new downlink control channel, performed by a UE. Furthermore, it is possible to provide a method for determining a resource to which the new downlink control channel is allocated for link quality improvement.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
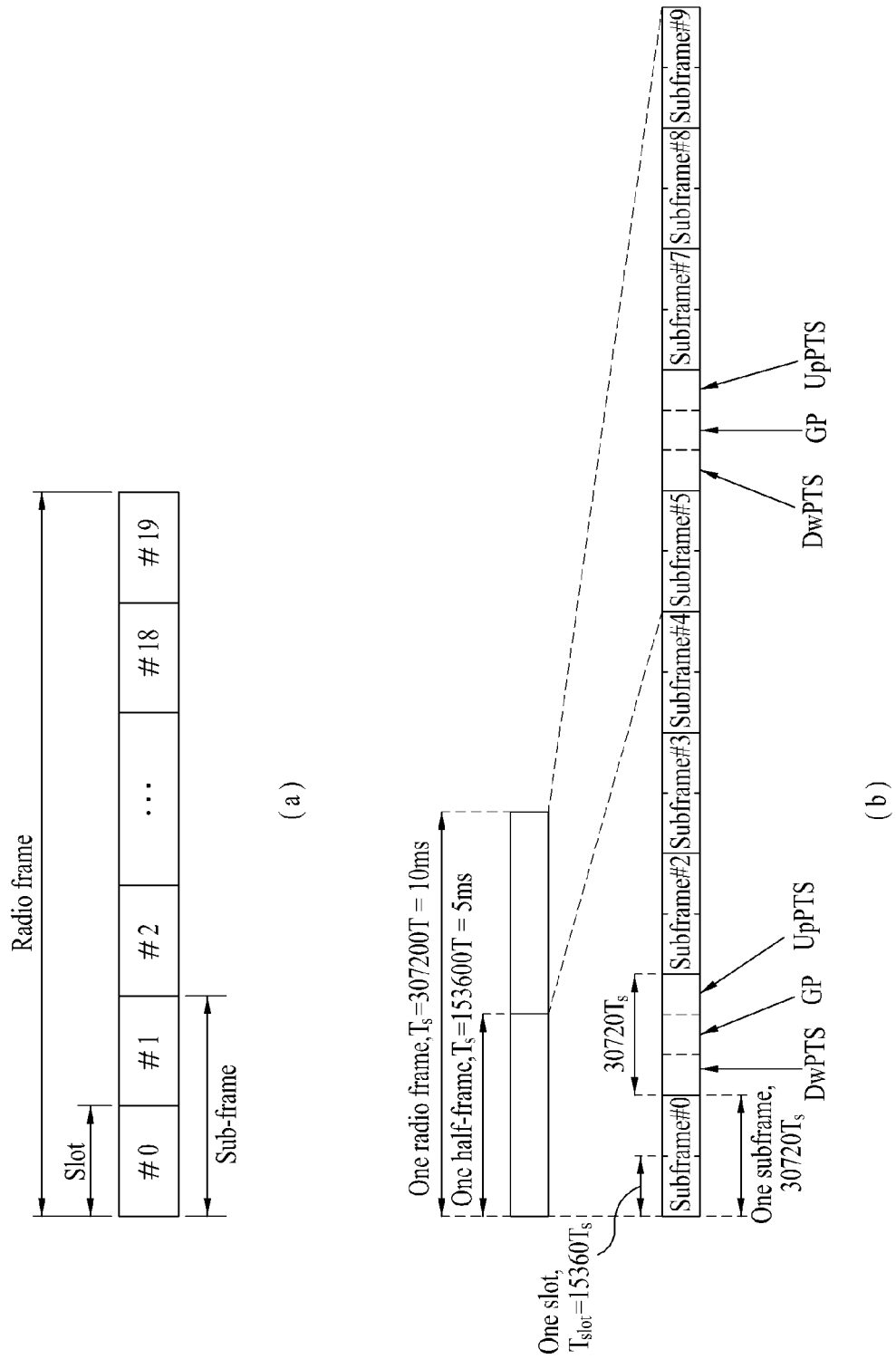
FIG. 1 illustrates a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

A description will be given of a radio frame structure of 3GPP LTE with reference to FIG. 1.

In a cellular OFDM wireless packet communication system, uplink/downlink data packet transmission is performed on a subframe-by-subframe basis and one subframe is defined as a predetermined time interval including a plurality of OFDM symbols. 3GPP LTE supports type-1 radio frame applicable to FDD (frequency division duplex) and type-2 radio frame applicable to TDD (time division duplex).

FIG. 1(a) illustrates a type-1 radio frame structure. A downlink radio frame includes 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of OFDM symbols in the time domain and a plurality of resource blocks (RBs) in the frequency domain. Since 3GPP LTE adopts OFDMA for downlink, an OFDM symbol represents one symbol period. An OFDM symbol may be referred to as an SC-FDMA symbol or symbol period. A resource block (RB) is a resource allocation unit including a plurality of contiguous subcarriers in a slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the duration of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

FIG. 1(b) illustrates a type-2 radio frame structure. The type-2 radio frame includes 2 half frames. Each half frame includes 5 subframes, a downlink pilot time slot (DwPTS), a guard period (GP) and an uplink pilot time slot (UpPTS). One subframe consists of 2 slots. The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between a UL and a DL. One subframe includes 2 slots irrespective of radio frame type.

The radio frame structure is purely exemplary and thus the number of subframes in a radio frame, the number of slots in a subframe, or the number of OFDM symbols in a slot may vary.

Figure 2:
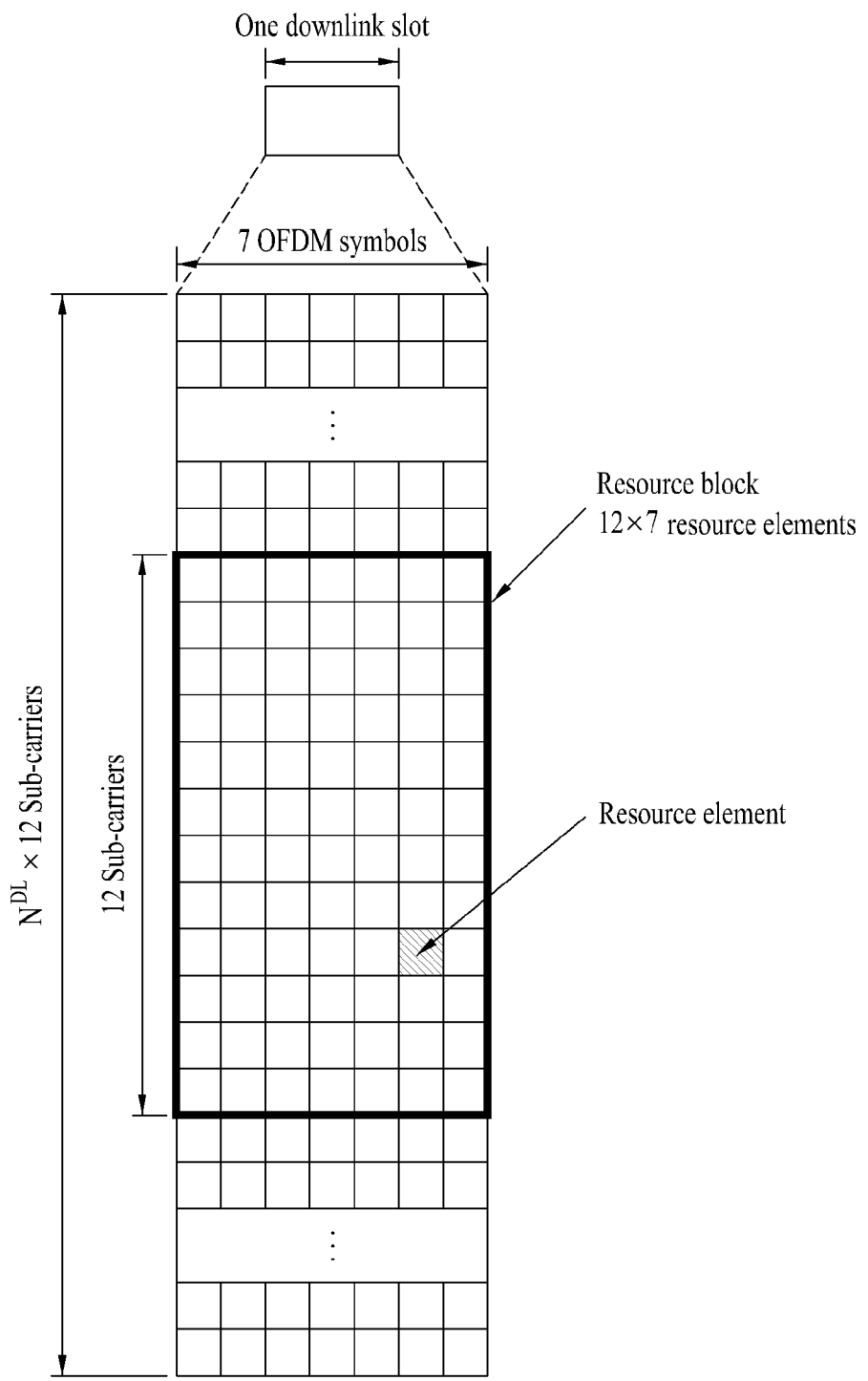
FIG. 2 illustrates a resource grid.

FIG. 2 illustrates a resource grid in a downlink slot. While one downlink slot includes 7 OFDM symbols in the time domain and one RB includes 12 subcarriers in the frequency domain in FIG. 2, the present invention is not limited thereto. For example, one slot includes 7 OFDM symbols in the case of normal CP whereas one slot includes 6 OFDM symbols in the case of extended CP. Each element on the resource grid is referred to as a resource element (RE). One RB includes 12×7 REs. The number $N^{DL}$ of RBs included in the downlink slot depends on a downlink transmit bandwidth. The structure of an uplink slot may be same as that of the downlink slot.

Figure 3:
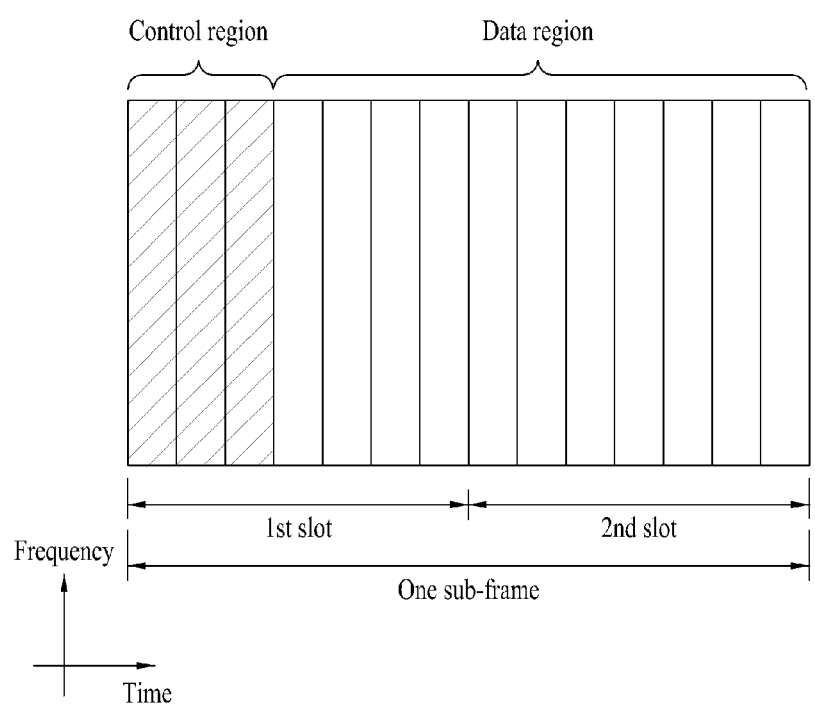
FIG. 3 illustrates a downlink subframe structure.

FIG. 3 illustrates a downlink subframe structure. A maximum of three OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or uplink Tx power control commands for an arbitrary UE group. The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with an identifier referred to as a radio network temporary identifier (RNTI) according to an owner or usage of the PDCCH. If the PDCCH is for a specific UE, a cell-RNTI (C-RNTI)) of the UE may be masked to the CRC. Alternatively, when the PDCCH is for a paging message, a paging indicator identifier (P-RNTI) may be masked to the CRC. When the PDCCH is for system information (more specifically, a system information block (SIB)), a system information identifier and system information RNTI (SI-RNTI) may be masked to the CRC. To indicate a random access response corresponding to a response to transmission of a random access preamble of the UE, a random access-RNTI (RA-RNTI) may be masked to the CRC.

Figure 4:
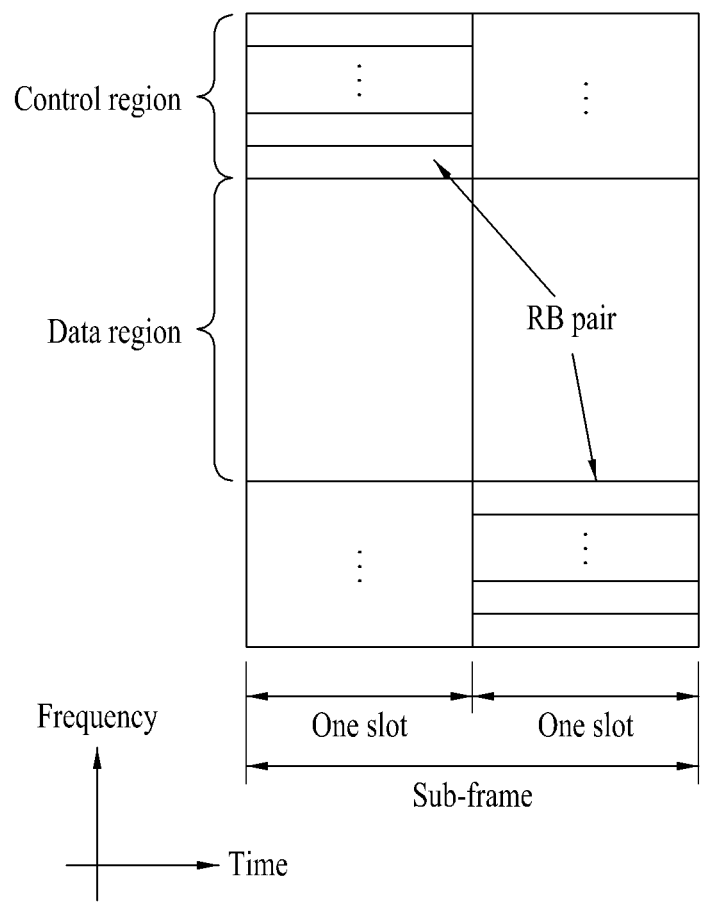
FIG. 4 illustrates an uplink subframe structure.

FIG. 4 illustrates an uplink subframe structure. An uplink subframe may be divided into a control region and a data region in the frequency domain. The control region is allocated a PUCCH including uplink control information. The data region is allocated a PUSCH including user data. To maintain single carrier property, one UE cannot simultaneously transmit a PUCCH and a PUSCH. A PUCCH for a UE is allocated to an RB pair. RBs belonging to an RB pair occupy different subcarriers in 2 slots. That is, an RB pair allocated to a PUCCH is frequency-hopped at a slot boundary.

Reference Signal (RS)

Since a packet is transmitted through a radio channel in a wireless communication system, a signal may be distorted during transmission. A receiver needs to correct the distorted signal using channel information in order to correctly receive the distorted signal. To detect channel information, a signal known to both the receiver and a transmitter is transmitted and channel information is detected using a degree of distortion of the signal when the signal is received through a certain channel. This signal is called a pilot signal or a reference signal.

When multiple antennas are used to transmit and receive data, a correct signal can be received only when channel state between each Tx antenna and each Rx antenna is detected. Accordingly, a reference signal is required for each Tx antenna.

A downlink reference signal defines a common reference signal (CRS) shared by all UEs in a cell and a dedicated reference signal (DRS) dedicated to a specific UE. Information for channel estimation and demodulation can be provided according to these reference signals.

A receiver (UE) can estimate channel state from the CRS and feed back an indicator related to channel quality, such as a channel quality indicator (CQI), a precoding matrix index (PMI) and/or a rank indicator (RI), to a transmitter (eNB). The CRS may be called a cell-specific reference signal. An RS related to feedback of channel state information (CSI) such as CQI/PMI/RI may be defined as a CSI-RS.

The DRS can be transmitted through a corresponding RE when data demodulation is needed. Presence or absence of the DRS may be signaled to the UE by a higher layer. In addition, the fact that the DRS is valid only when a corresponding PDSCH is mapped may be signaled to the UE. The DRS may be called a UE-specific reference signal or a demodulation reference signal (DMRS).

Figure 5:
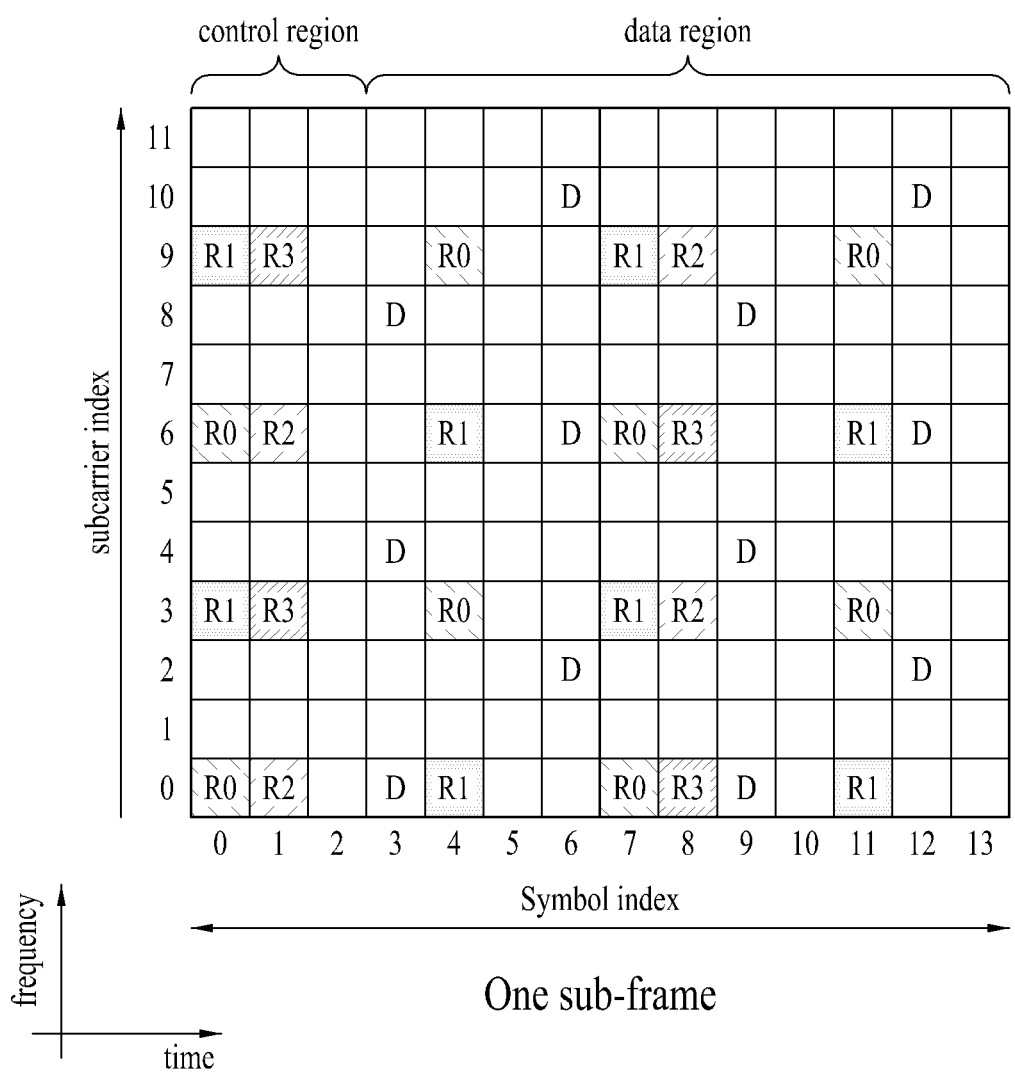
FIG. 5 illustrates a downlink reference signal.

FIG. 5 illustrates a pattern of mapping a CRS and a DRS defined in 3GPP LTE (e.g. release-8) to a downlink resource block (RB) pair. A downlink RB pair as a reference signal mapping unit may be represented as one subframe in the time domain×12 subcarriers in the frequency domain. That is, an RB pair has a length of 14 OFDM symbols in the case of normal CP and has a length of 12 OFDM symbols in the case of extended CP in the time domain. FIG. 5 shows RB pairs in the case of normal CP.

FIG. 5 shows RS positions in RB pairs in a system in which an eNB supports 4 transmit antennas. In FIG. 5, REs indicated by 'R0', 'R1', 'R2' and 'R3' respectively represent CRS positions with respect to antenna port indices 0, 1, 2 and 3. An RE indicated by 'ID' represents a DRS position.

CRSs will be described in detail hereinafter.

The CRS is used to estimate a channel of a physical antenna and can be commonly received by all UEs in a cell. The CRS is distributed in the entire band. The CRS can be used for CSI acquisition and data demodulation.

The CRS is defined in various forms according to antenna configuration of a transmitter (eNB). 3GPP LTE (e.g. release-8) supports various antenna configurations and a downlink signal transmitter (eNB) may have three antenna configurations of a single antenna, 2 Tx antennas and 4 Tx antennas. When the eNB performs single antenna transmission, an RS for a single antenna port is provided. When the eNB performs 2-antenna transmission, RSs for 2 antenna ports are provided through time division multiplexing (TDM) and/or frequency division multiplexing (FDM). That is, the ROSs for the 2 antenna ports can be discriminated from each other by being present in different time resources and/or different frequency resources. Furthermore, when the eNB performs 4-antenna transmission, RSs for 4 antenna ports are provided through TDM/FDM. Channel information estimated by a signal receiver (UE) using the CRS can be used to demodulate data transmitted through single antenna transmission, transmit diversity, closed-loop spatial multiplexing, open-loop spatial multiplexing, multi-user MIMO (MU-MIMO), etc.

In case of multi-antenna transmission, when an RS is transmitted through a specific antenna port, the RS is transmitted in an RE designated according to RS pattern and no signal is transmitted in REs designated for other antenna ports.

A rule of mapping the CRS to an RB conforms to Equation 12.

$$k = 6m + (v + v_{shift}) \bmod 6 \qquad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k is a subcarrier index, l is a symbol index, p is an antenna port index. In addition, $N_{symb}^{DL}$ denotes the number of OFDM symbols of a downlink slot, $N_{RB}^{DL}$ denotes the number of RBs allocated to downlink, n, a slot index, $N_{ID}^{cell}$ is a cell ID and mod denotes modulo operation. An RS position in the frequency domain depends on $V_{shift}$. Since $V_{shift}$ depends on cell ID, the RS position has different frequency shift values per cell.

Specifically, to improve channel estimation performance through the CRS, a CRS position in the frequency domain is shifted per cell such that cells have different frequency shift values. For example, when an RS is present for every 3 subcarriers, the RS can be present in a subcarrier 3k in a cell and in a subcarrier 3k+1 in another cell. For an antenna port, an RS is distributed at an interval of 6 REs (i.e. 6 subcarriers) in the frequency domain and spaced apart from REs in which an RS for another antenna port is present in the frequency domain.

Power boosting may be applied to the CRS. Power boosting is a method for transmitting an RS with higher power using power corresponding to REs of an OFDM symbol, other than REs allocated for the RS.

An RS is disposed at a specific interval starting from symbol index (l) 0 of each slot in the time domain. The interval is defined based on CP length. RSs are present in symbols corresponding to symbol indices 0 and 4 in a slot in the case of normal CP and present in symbols corresponding to symbol indices 0 and 3 in the slot in the case of extended CP. Only RSs for up to 2 antenna ports are defined in a single OFDM symbol. Accordingly, in the case of 4-Tx antenna transmission, RSs for antenna ports 0 and 1 are present in symbols corresponding to symbol indices 0 and 4 (symbol indices 0 and 3 in the extended CP case) in a slot and RSs for antenna ports 2 and 3 are present in a symbol corresponding to symbol index 1 in the slot. However, the frequencies of the RSs for antenna ports 2 and 3 are switched in the second slot.

A DRS will now be described in detail hereinafter.

The DRS (or UE-specific RS) is used for data demodulation. A precoding weight used for a specific UE is used for an RS in multi-antenna transmission such that the UE can estimate an equivalent channel obtained by combining the precoding weight transmitted through each Tx antenna and a transport channel when receiving the RS.

3GPP LTE (e.g. release-8) supports transmission through up to 4 Tx antennas and defines a DRS for rank-1 beamforming. The DRS for rank-1 beamforming is also used as an RS for antenna port index 5. A rule of mapping the DRS to an RB conforms to Equation 2. Equation 2 relates to the normal CP case.

$$k = (k') \bmod N_{sc}^{RB} + N_{sc}^{RB} \cdot n_{PRB} \quad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

In Equation 2, k is a subcarrier index, l is a symbol index, p is an antenna port index. In addition, $N_{SC}^{RB}$ denotes an RB size in the frequency domain and is represented by the number of subcarriers, $n_{PRB}$ denotes a PRB number, $N_{RB}^{PDSCH}$ denotes the bandwidth of an RB in which a corresponding PDSCH is transmitted, n, is a slot index, $N_{ID}^{cell}$ is a cell ID and mod denotes modulo operation. An RS position in the frequency domain depends on $V_{shift}$. Since $V_{shift}$ depends on cell ID, the RS position has different frequency shift values per cell.

LTE-A, the next generation of 3GPP LTE, considers MIMO, multi-cell transmission, enhanced MU-MIMO, etc. of a high order and also considers DRS based data demodulation in order to support efficient RS operation and an improved transmission scheme. That is, a DRS for two or more layers can be defined to support data transmission through an added antenna, separately from the DRS (antenna port index 5) for rank-1 beamforming, defined in 3GPP LTE (e.g. release-8).

Figure 6:
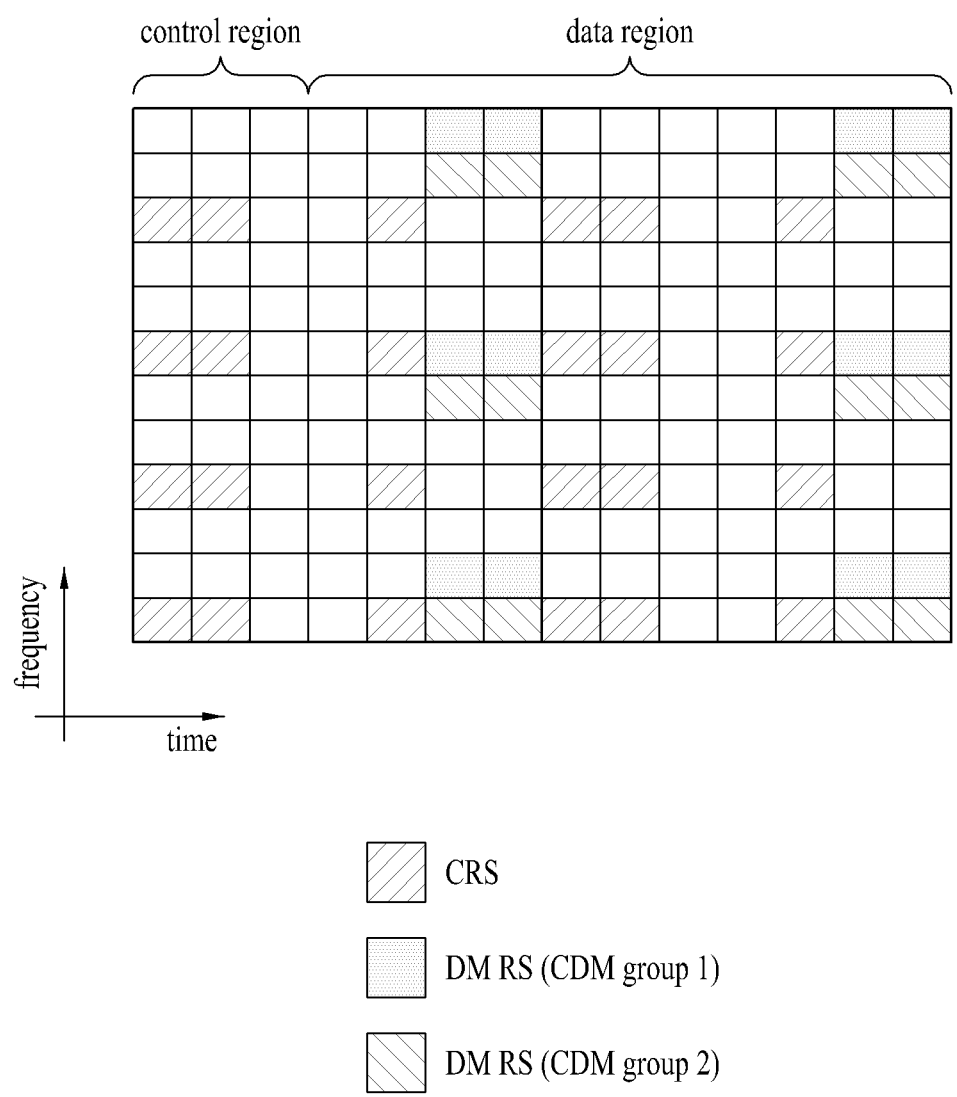
FIG. 6 illustrates an exemplary DMRS pattern defined in LTE-A.

FIG. 6 illustrates an exemplary DMRS pattern defined in LTE-A.

FIG. 6 shows the position of an RE through which a DMRS is transmitted on one RB pair (14 OFDM symbols in the time domain×12 subcarriers in the frequency domain in the case of normal CP) through which downlink data is transmitted. DMRSs can be transmitted for 8 antenna ports (antenna port indices 7 to 14) additionally defined in LTE-A. DMRSs with respect to different antenna ports can be identified by being located in different frequency resources (subcarriers) and/or different time resources (OFDM symbols) (i.e. multiplexed according to FDM and/or TDM). In addition, DMRSs with respect to different antenna ports, which are located in the same time-frequency resource, can be identified using an orthogonal code (i.e. multiplexed according to CDM).

In an enhanced wireless communication system (e.g. LTE-A), an additional reference signal (CSI-RS) for measurement of channel state information (CSI) for a new antenna port is defined.

Figure 7:
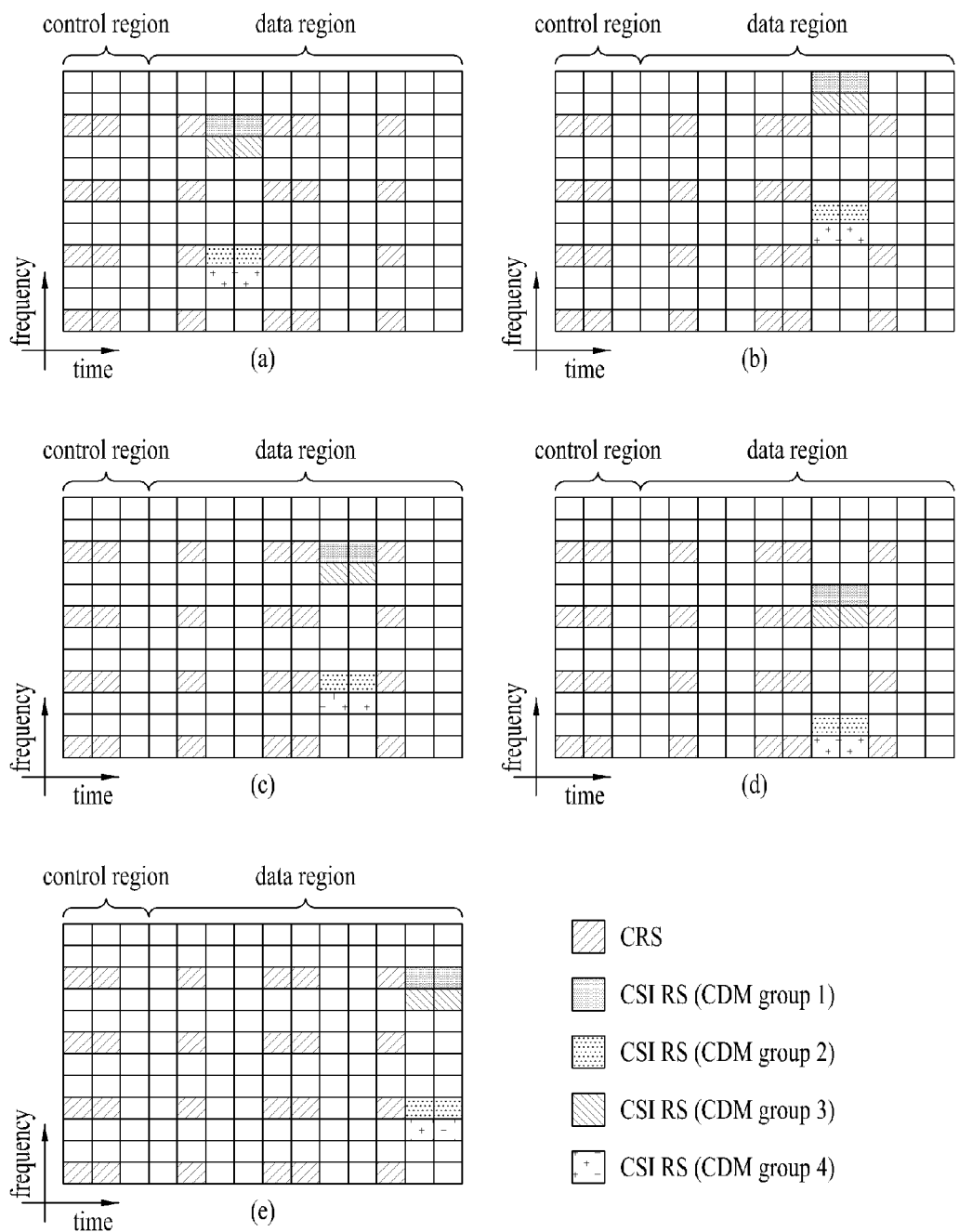
FIG. 7 illustrates exemplary CSI-RS patterns defined in LTE-A.

FIG. 7 illustrates exemplary CSI-RS patterns defined in LTE-A. FIG. 7 shows positions of REs on which CSI-RSs are transmitted on one RB pair (14 OFDM symbols in the time domain×12 subcarriers in the frequency domain in the case of normal CP) through which downlink data is transmitted. One of CSI-RS patterns of FIGS. 7(a) to 7(e) can be used in a downlink subframe. CSI-RSs can be transmitted for 8 antenna ports (antenna port indices 15 to 22) additionally defined in LTE-A. CSI-RSs with respect to different antenna ports can be identified by being located in different frequency resources (subcarriers) and/or different time resources (OFDM symbols) (that is, multiplexed according to FDM and/or TDM). In addition, CSI-RSs with respect to different antenna ports, which are located in the same time-frequency resource, can be identified using an orthogonal code (i.e. multiplexed according to CDM). In FIG. 7(a), CSI-RSs with respect to antenna ports #15 and #16 can be located in REs represented as CSI-RS CDM group 1 and can be multiplexed using an orthogonal code. In addition, CSI-RSs with respect to antenna ports #17 and #18 can be located in REs represented as CSI-RS CDM group 2 and can be multiplexed using an orthogonal code. CSI-RSs with respect to antenna ports #19 and #20 can be located in REs represented as CSI-RS CDM group 3 and can be multiplexed using an orthogonal code. CSI-RSs with respect to antenna ports #21 and #22 can be located in REs represented as CSI-RS CDM group 4 and can be multiplexed using an orthogonal code. The principle described with reference to FIG. 7(a) can be equally applied to FIGS. 7(b) to 7(e).

RS patterns shown in FIGS. 5, 6 and 7 are exemplary and various embodiments of the present invention are not limited to specific RS patterns. That is, various embodiments of the present invention can be equally applied to a case in which an RS pattern different from those of FIGS. 5, 6 and 7 is defined and used.

PDCCH Processing

When PDCCHs are mapped to REs, control channel elements (CCEs) corresponding to contiguous logical allocation units, are used. A CCE includes a plurality of (e.g. 9) REGs and an REG includes 4 neighboring REs except for an RS.

The number of CCEs necessary for a specific PDCCH depends on a DCI payload corresponding to control information size, cell bandwidth, channel coding rate, etc. Specifically, the number of CCEs for a specific PDCCH can be determined based on PDCCH format shown in Table 1.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

While one of the above-mentioned four PDCCH formats may be used, this is not signaled to a UE. Accordingly, the UE performs decoding without knowing the PDCCH format, which is referred to as blind decoding. Since operation overhead is generated if a UE decodes all CCEs that can be used for downlink for each PDCCH, a search space is defined in consideration of limitation for a scheduler and the number of decoding attempts.

The search space is a set of candidate PDCCHs composed of CCEs on which a UE needs to attempt to perform decoding at an aggregation level. The aggregation level and the number of candidate PDCCHs can be defined as shown in Table 2.

TABLE 2

| | Search space | | Number of PDCCH |
|---|---|---|---|
| | Aggregation level | Size (CCE unit) | candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown Table 2, the UE has a plurality of search spaces at each aggregation level because 4 aggregation levels are present. The search spaces may be divided into a UE-specific search space and a common search space, as shown in Table 2. The UE-specific search space is for a specific UE. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space is used for a case in which a plurality of UEs or all UEs need to receive PDCCHs, for system information dynamic scheduling or paging messages, for example. The common search space may be used for a specific UE for resource management. Furthermore, the common search space may overlap with the UE-specific search space.

The UE attempts to decode a search space, as described above. The number of decoding attempts is determined by DCI format and transmission mode determined through RRC signaling. When carrier aggregation is not applied, the UE needs to perform a maximum of 12 decoding attempts because 2 DCI sizes (DCI format 0/1A/3/3A and DCI format 1C) have to be considered for each of 6 PDCCH candidates for a common search space. For a UE-specific search space, 2 DCI sizes are considered for (6+6+2+2=16) PDCCH candidates and thus a maximum of 32 decoding attempts is needed. Accordingly, a maximum of 44 decoding attempts needs to be performed when carrier aggregation is not applied.

Enhanced Physical Downlink Control Channel

In 3GPP LTE-A release-11 (Rel-11) or systems following the same, introduction of a multi-node system including a plurality of access nodes within a cell has been decided for performance improvement. For example, the multi-node system can include a distributed antenna system (DAS), radio remote head (RRH), distributed multi-node system (DMNS), etc. Methods for applying various MIMO schemes and coordinated communication schemes (e.g. CoMP) to a multi-node environment are under development. To apply various MIMO schemes and coordinated communication schemes to a multi-node environment, a new control channel different from the conventional PDCCH needs to be introduced. For example, the PDCCH carries only control information on one cell/node. However, multiple cells/nodes participate in transmission with respect to one UE in a multi-node system, and thus the quantity of control information on the multiple cells/nodes may increase. Since it is difficult for the PDCCH to support transmission of an increased amount of control information because capacity of the PDCCH is limited, introduction of a new control channel is required to solve the problem of the PDCCH.

A new downlink control channel may be referred to as an enhanced PDCCH (E-PDCCH). The E-PDCCH corresponds to a control channel in a new format which carries DCI for scheduling allocation for UEs and can be introduced to effectively support inter-cell interference coordination (ICIC), multi-node system, CoMP (coordinated multi-point), MU-MIMO, etc.

The E-PDCCH is discriminated from the PDCCH in that the E-PDCCH is allocated to a time-frequency resource region (e.g. data region of FIG. 3) other than a region (e.g. control region of FIG. 3) defined for PDCCH transmission in LTE/LTE-A (the PDCCH is referred to as a legacy PDCCH to be discriminated from the E-PDCCH hereinafter). For example, mapping of the E-PDCCH to REs can be represented as mapping to OFDM symbols other than first N (N≤4) OFDM symbols of a downlink subframe in the time domain and mapping to a set of semi-statically allocated resource blocks (RBs) in the frequency domain.

A UE can perform blind decoding to detect whether an E-PDCCH thereof is transmitted. Here, when the number of UEs accessing a specific cell/node increases, a larger number of E-PDCCHs need to be allocated in a PDSCH region. In this case, complexity of blind decoding that needs to be performed by a UE may increase.

As described above, the legacy PDCCH is transmitted in a common search space (CSS) and UE-specific search space (USS) within a limited resource (first to third OFDM symbols). The E-PDCCH assumes resource allocation on an RB-by-RB basis and carries control information through a much larger amount of resources compared to the legacy PDCCH, and thus a high coding gain can be obtained.

In addition, distributed allocation or localized allocation can be applied as an E-PDCCH resource allocation method according to mobility or Doppler spread characteristics of a UE. For example, distributed allocation is applicable when the UE rapidly moves or has high Doppler spread characteristics, whereas localized allocation is applicable when the UE slowly moves or has low Doppler spread characteristics. If control information is provided to a UE having low mobility through an E-PDCCH, then the same beam as applied to a PDSCH can be applied to the E-PDCCH and thus the UE can obtain additional beam gain.

When control information transmission method applied to the legacy PDCCH is considered for the E-PDCCH, transmission can be performed in a region having relatively high channel quality (e.g. SNR (signal-to-noise plus interference ratio) due to increased coding gain and beam gain in a specific situation. This may not be desirable in terms of resource efficiency. For example, according to the E-PDCCH multiplexing experimental result disclosed in R1-113195, "Performance evaluation of multiplexing schemes for enhanced PDCCH transmission", LG Electronics (3GPP TSG RAN WG1 Meeting #66bis, Zhuhai, China, 10-14 Oct. 2011), when DCI format 1A is transmitted through an E-PDCCH, resources cannot be efficiently used since most of UEs operating according to MU-MIMO as well as UEs operating according to SU-MIMO transmit control information at aggregation level 1.

Figure 8:
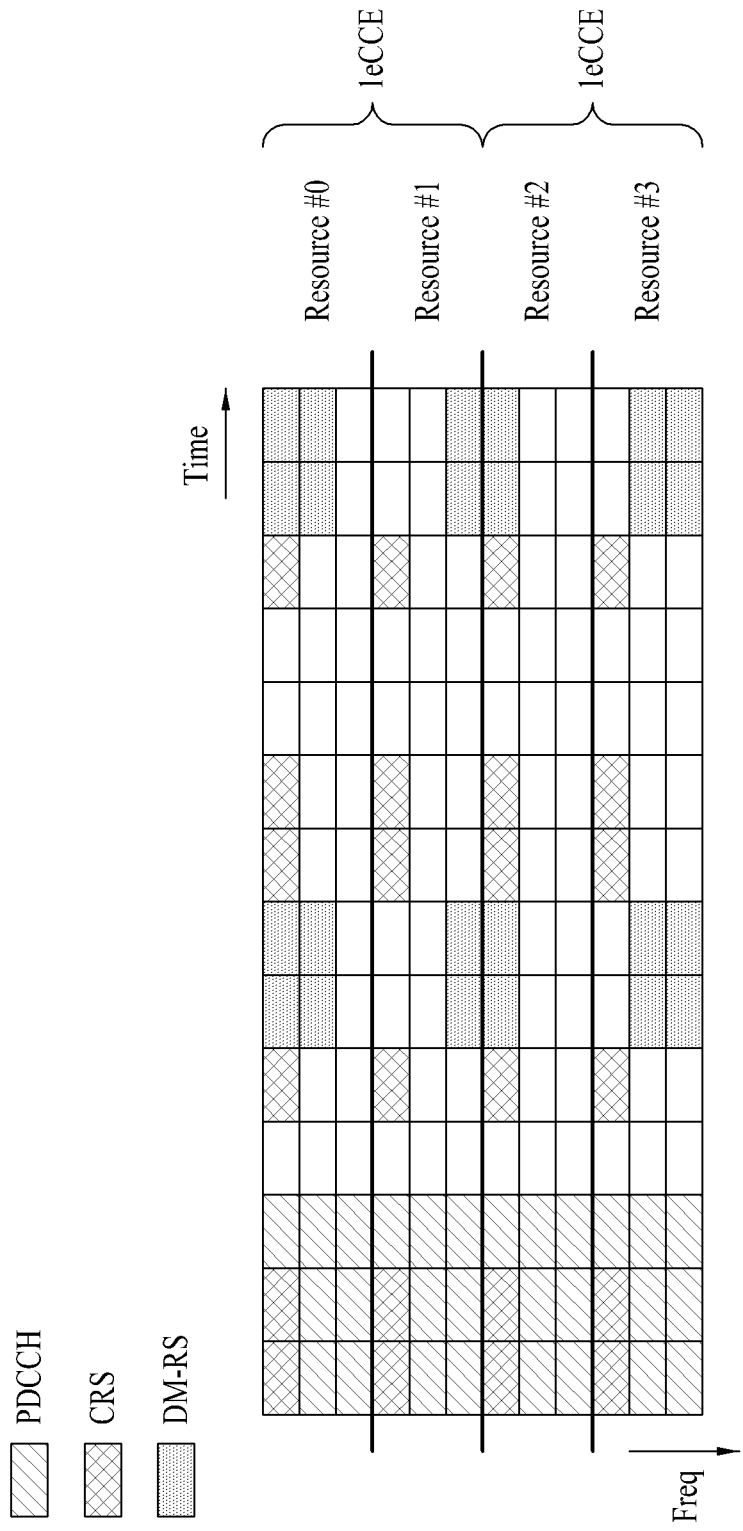
FIG. 8 illustrates an exemplary E-PDCCH allocation method.

FIG. 8 illustrates an exemplary E-PDCCH allocation scheme.

Similarly to definition of legacy-PDCCH transmission as transmission through an integer multiple (i.e. aggregation level 1, 2, 4 or 8) of a CCE (control channel element), E-PDCCH transmission can be defined as transmission through an integer multiple of a newly defined E-CCE (enhanced-CCE). While a region to which E-PDCCHs can be allocated is divided into 4 resources #0 to #3 in one RB pair in FIG. 8, the present invention is not limited thereto and one or more resources to which E-PDCCHs are allocated can be configured in one RB pair.

Here, transmission of an E-CCE of aggregation level 1 within one RB pair is referred to as localized allocation and distribution of the E-CCE over multiple RB pairs is referred to as distributed allocation.

For example, according to localized E-PDCCH allocation (or non-interleaving scheme), one E-CCE of aggregation level 1 can be allocated to two resources (e.g. resources #0 and #1 of FIG. 8) in one RB pair.

Figure 9:
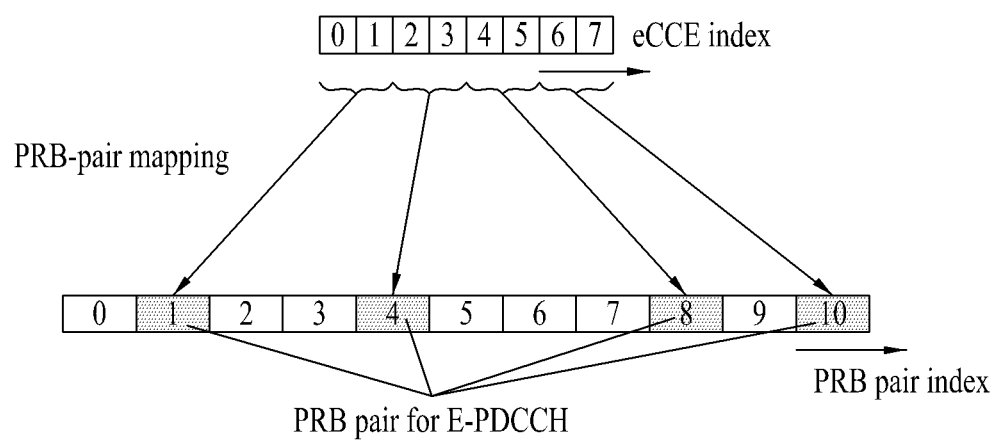
FIG. 9 illustrates an exemplary localized E-PDCCH allocation method.

FIG. 9 illustrates an exemplary localized E-PDCCH allocation scheme. The localized E-PDCCH allocation scheme shown in FIG. 9 is based on the assumption that one RB pair is divided into 4 resources as described above with reference to FIG. 8. If indices of physical resource block (PRB) pairs to which E-PDCCHs can be allocated are 1, 4, 8 and 10, as shown in FIG. 9, E-CCEs 0 and 1 can be allocated to PRB pair 1, E-CCE 0 can be allocated to resources #0 and #1 of PRB pair 1 and E-CCE 1 can be allocated to resources #2 and #3 of PRB pair 1. Similarly, E-CCEs 2 and 3 can be allocated to PRB pair 4, E-CCEs 4 and 5 can be allocated to PRB pair 8, and E-CCEs 6 and 7 can be allocated to PRB pair 10.

According to distributed E-PDCCH allocation (or interleaving scheme), one E-CCE of aggregation level 1 can be distributed and allocated to two RB pairs.

Figure 10:
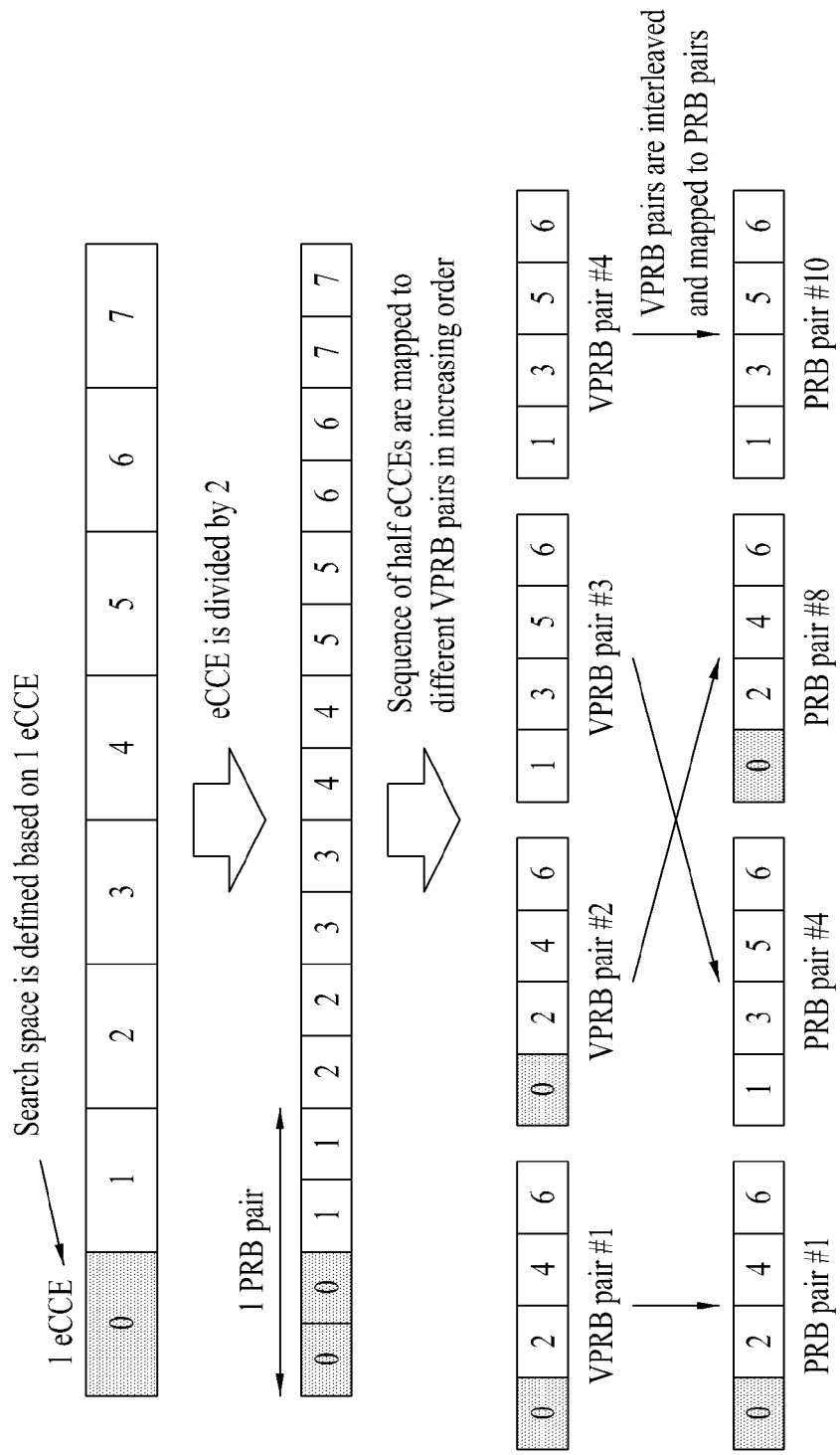
FIG. 10 illustrates an exemplary distributed E-PDCCH allocation method.

FIG. 10 illustrates an exemplary distributed E-PDCCH allocation scheme. The distributed E-PDCCH allocation scheme shown in FIG. 10 is based on the assumption that one RB pair is divided into 4 resources, as described above with reference to FIG. 8. In FIG. 10, one E-CCE can be divided into two, interleaved and mapped to virtual resource block (VRB) pairs. Here, one VRB can be mapped to one PRB and a VRB-to-PRB mapping rule (e.g. VRB index interleaving) can be defined in a predetermined manner. Accordingly, one E-CCE can be divided into two and mapped to different PRB pairs. For example, E-CCE 0 is divided and allocated to VRB pairs #1 and #2 and thus E-CCE 0 is divided and allocated to PRB pairs #1 and #8 according to the VRB-to-PRB mapping rule. Similarly, E-CCE 1 is divided and allocated to PRB pairs #4 and #10, E-CCE 2 is divided and allocated to PRB pairs #1 and #8, E-CCE 3 is divided and allocated to PRB pairs #4 and #10, E-CCE 4 is divided and allocated to PRB pairs #1 and #8, E-CCE 5 is divided and allocated to PRB pairs #4 and #10, E-CCE 6 is divided and allocated to PRB pairs #1 and #8 and E-CCE 7 is divided and allocated to PRB pairs #4 and #10.

In the following description, RB pairs to which localized allocation is applied are referred to as localized allocation regions and RB pairs to which distributed allocation is applied are referred to as distributed allocation regions. For example, localized allocation can be applied to improve link quality by providing frequency selection gain and beam-forming gain to a slowly moving UE and distributed allocation can be applied to robustly transmit a unicast channel for a rapidly moving UE or a broadcast/multicast channel for a plurality of UEs.

An enhanced REG (E-REG) can be used to define REs to which E-PDCCHs are mapped. For example, 16 E-REGs (i.e. E-REG 0 to E-REG 15) can be provided for one PRB pair. REs other than REs to which DMRSs are mapped in one PRB are numbered 0 to 15. The numbering order conforms to frequency increasing order and then to time increasing order. For example, REs numbered i constitute one E-REG i.

The E-PDCCH may be transmitted using one E-CCE or an aggregate of a plurality of E-CCEs. Each E-CCE may include one or multiple E-REGs. The number of E-REGs per E-CCE can be 4 or 8, for example (4 in the case of a normal subframe of normal CP).

E-CCEs available for the E-PDCCH may be numbered from 0 to $N_{ECCE}-1$. $N_{ECCE}$ may be 1, 2, 4, 8, 16 or 32.

The number of REs corresponding to a PRB pair set for E-PDCCH transmission may be defined as the number of REs satisfying the following conditions, that is, i) the REs should belong to one of 16 E-REGs of a PRB pair, ii) the REs should not be used for a CRS or CSI-RS and iii) the REs should belong to OFDM symbols having indices greater than the index of the OFDM symbol at which the E-PDCCH is started.

In addition, the E-PDCCH may be mapped to REs according to the localized or distributed method, as described above. The E-PDCCH may be mapped to REs satisfying the following conditions, that is, a) the REs should belong to an E-REG allocated for transmission, b) the REs should not belong to a PRB pair used to transmit a physical broadcast channel (PBCH) or a synchronization signal, c) the REs should not be used for a CRS or a CSI-RS for a specific UE and d) the REs should belong to OFDM symbols having indices greater than the index of the OFDM symbol at which the E-PDCCH is started.

For E-PDCCH allocation, one or multiple E-PDCCH-PRB-sets may be configured for a UE through higher layer signalling from an eNB. For example, E-PDCCH-PRB-sets can be provided for monitoring.

E-PDCCH Resource Allocation Scheme

As described above, localized allocation and distributed allocation can be defined as E-PDCCH resource allocation schemes. However, a method of allocating an E-PDCCH to a PRB of a PDSCH region is not defined in detail although the allocation schemes are defined. The present invention provides a method for determining an E-PDCCH allocatable resource region for efficient E-PDCCH transmission.

The present invention is described on the assumption that regions in which an E-PDCCH can be transmitted are divided into a localized allocation region and a distributed allocation region. The localized allocation region and the distributed allocation region may be defined as shown in Table 3. That is, the localized allocation region can be understood as a region having characteristics described in the left column of Table 3 and the distributed allocation region can be understood as a region having characteristics described in the right column of Table 3.

TABLE 3

| | Localized allocation region | Distributed allocation region |
|---|---|---|
| 1 | An E-PDCCH of a minimum aggregation level is transmitted in one RB pair. | An E-PDCCH of a minimum aggregation level is divided and transmitted over multiple RB pairs. |
| 2 | One CCE/E-CCE is configured or mapped within one RB pair. | One CCE/E-CCE is divided and mapped to multiple RB pairs. |
| 3 | An E-PDCCH search space is configured or mapped to consecutive RB pairs. | An E-PDCCH search space is configured or mapped to distributed RB pairs. |
| 4 | When N DMRS ports are present, an E-PDCCH of one UE is transmitted through only some of the N DMRS ports. | When N DMRS ports are present, an E-PDCCH of one UE is transmitted through all N DMRS ports. |
| 5 | The region is set such that it is searched by a UE set to a transmission mode (TM) corresponding to closed-loop MIMO operation. | The region is set such that it is searched by a UE which searches for DCI format 1A or is set to a transmission mode (TM) corresponding to open-loop MIMO operation (or transport diversity, open-loop spatial multiplexing). |
| 6 | Region is searched for an E-PDCCH transmitted through one layer. | The region is searched for an E-PDCCH to which SFBC (space-frequency block coding)/STBC (space-time block coding) is applied. |
| 7 | Beamforming (or adaptive beamforming) is applied. | Transport diversity (SFBC/STBC or non-adaptive beamforming) is applied. |

In Table 3, closed-loop MIMO refers to a MIMO scheme in which a transmitting end considers feedback information from a receiving end and open-loop MIMO refers to a MIMO scheme in which the transmitting end performs MIMO operation without feedback information from the receiving end or without considering the feedback information.

A description will be given of a method for configuring or determining a localized E-PDCCH allocation region (i.e. available resource region to which an E-PDCCH can be allocated according to localized allocation). The following description is based on the assumption that a maximum of 2 E-CCEs can be transmitted in one RB pair, as shown in FIG. 8. However, the scope of the present invention is not limited thereto and the principle of the present invention can be equally applied to a case in which one or more E-CCEs can be transmitted in one RB pair.

Embodiment 1

Embodiment 1 relates to a method for configuring a localized E-PDCCH allocation region on specific RB(s) of divided parts (i.e. partitions) in the frequency domain.

Specifically, a set of resource regions to which an E-PDCCH for a specific UE can be allocated according to localized allocation may be configured as a group of RBs which satisfy specific conditions rather than being present on consecutive PRBs. It is noted that an E-PDCCH for a specific UE is allocated according to the localized allocation scheme since the E-PDCCH is allocated to consecutive resources in an E-PDCCH allocatable resource region even though E-PDCCH allocatable resource regions are not consecutive.

Figure 11:
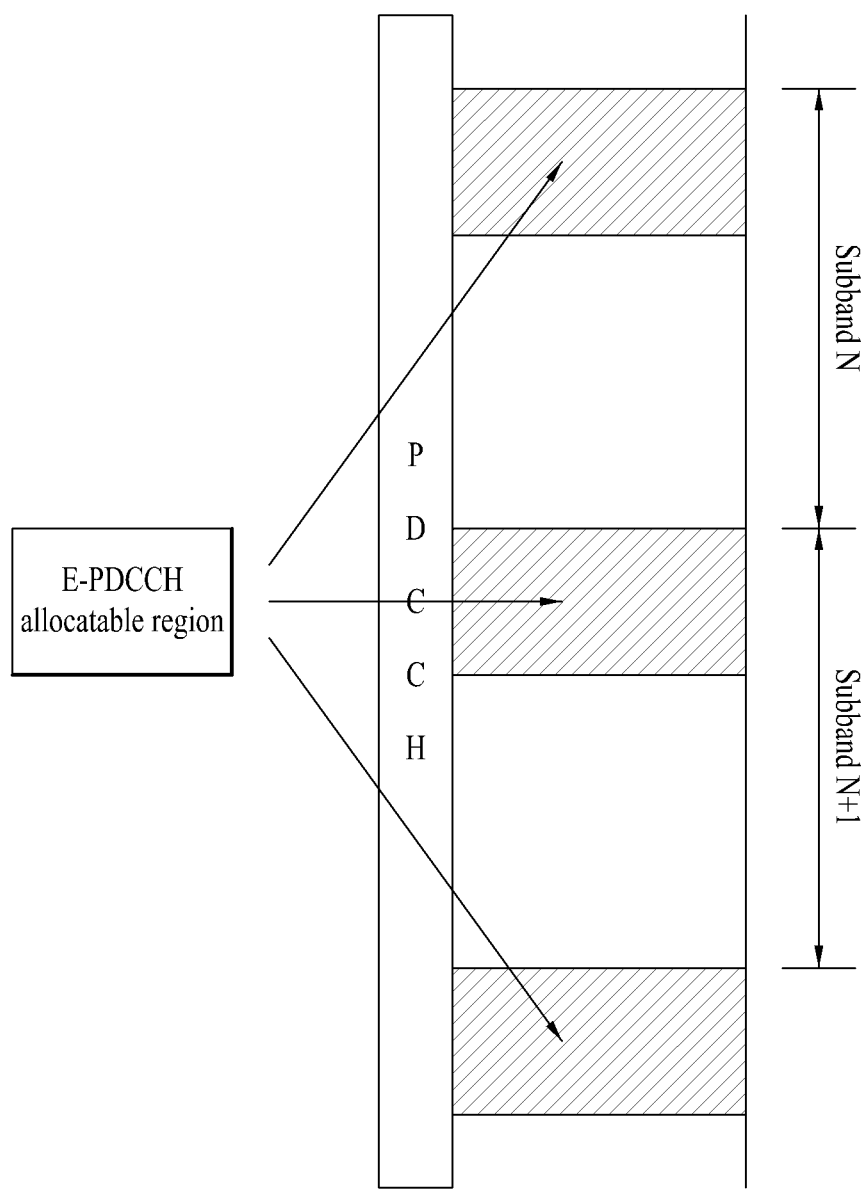
FIG. 11 illustrates an exemplary localized E-PDCCH allocable region.

FIG. 11 illustrates exemplary localized E-PDCCH allocatable regions.

FIG. 11 shows an example of configuring partitions using a subband unit. A subband can be defined as a subset of the entire downlink system band (or wideband) and the size of a subband can be determined depending on downlink system bandwidth. For example, the size of a subband can be determined as 4 RBs when the system bandwidth corresponds to 8 to 26 RBs, 6 RBs when the system bandwidth corresponds to 27 to 63 RBs and 8 RBs when the system bandwidth corresponds to 64 to 110 RBs. A subband may be set as a target of CSI calculation/generation in a specific aperiodic channel state information (CSI) reporting mode (e.g. reporting mode 3-0 or 3-1). For example, when aperiodic CSI reporting mode 3-0 is set, an eNB can set a group of subbands for which a UE needs to calculate/generate CSI and the UE can calculate CSI (e.g. subband CQI) about each subband belonging to the subband group and report the CSI to the eNB.

A partition may be configured using a precoding resource block group (PRG) unit. A PRG refers to a resource block group to which the same precoding matrix (or precoding vector) is applied in an FDD system. That is, one PRG may be composed of one or more consecutive PRBs. For example, a PRG is defined as 1 RB when the system bandwidth is less than 10 RBs, 2 RBs when the system bandwidth corresponds to 11 to 26 RBs, 3 RBs when the system bandwidth corresponds to 27 to 63 RBs, 2 RBs when the system bandwidth corresponds to 64 to 110 RBs.

While the partition is composed of subbands in the following description, the present invention is not limited thereto and the principle of the present invention can be equally applied to a case in which the partition is configured using a PRG or an RB group.

As shown in FIG. 11, the frequency domain can be divided into a plurality of subbands (subbands N, N+1, . . . ) and one or more RBs can be set as an E-PDCCH allocatable resource region in each subband (one subband is composed of multiple RBs). For example, the RB having the lowest index in one subband can be set as an E-PDCCH allocatable resource region. FIG. 11 shows a case in which the RB having the lowest index in subband N, the RB having the lowest index in subband N+1 and the RB having the lowest index in subband N+2 are configured as E-PDCCH allocatable resource regions.

The positions of E-PDCCH allocatable resource regions may be pre-defined and shared between an eNB and a UE or an eNB may set specific resource regions and signal the resource regions to the UE. The positions of E-PDCCH allocatable resource regions may be provided in the form of a bitmap. The bitmap level may correspond to a partition unit (e.g. subband unit), RB unit or CCE/E-CCE unit. Information on the positions of E-PDCCH allocatable resource regions may be provided to the UE through higher layer signalling. Specifically, localized allocation resource regions can be configured as a group of specific RBs in a plurality of partitions and information on a partition corresponding to a localized allocation resource region from among the plurality of partitions within the system bandwidth and/or information on RBs corresponding to the localized allocation resource region within each partition can be provided to the UE through higher layer signalling. In addition, E-PDCCH allocatable resources may be defined as the aforementioned one or more E-PDCCH-PRB-sets.

Embodiment 2

Embodiment 2 relates to a method for determining a resource region preferentially included in a localized E-PDCCH allocation region.

Specifically, an E-PDCCH search space is set in a localized allocation region (i.e. a group of RBs to which E-PDCCHs can be allocated according to localized allocation) determined according to embodiment 1. Otherwise, the localized allocation region determined according to embodiment 1 may correspond to the E-PDCCH search space. The E-PDCCH search space is UE-specifically set and can be understood as a set of resource regions in which the corresponding UE attempts E-PDCCH blind decoding. That is, the E-PDCCH search space is a set of candidate E-PDCCHs composed of E-CCEs, for which the UE needs to attempt decoding at each aggregation level.

According to the present embodiment, the UE-specific E-PDCCH search space may be configured according to predetermined priority. Here, a specific resource region may be configured using a specific partition (or subband), a specific RB or a specific E-CCE.

For example, at least one of a plurality of E-PDCCH candidates which constitute the UE-specific E-PDCCH search space can include an E-CCE belonging to the subband having a highest CQI from among subband CQIs reported by the UE to the eNB. More specifically, the E-CCE at which a search space corresponding to each aggregation level is started may be set as the E-CCE belonging to the subband having the highest CQI. This is because it is desirable that the E-PDCCH as well as PDSCH is transmitted in the subband having the highest CQI in order to obtain band selection (or frequency selection) gain.

A CQI is information which indicates a combination of a modulation scheme (e.g. one of QPSK (Quadrature Phase Shift Keying), 16 QAM (Quadrature Amplitude Modulation) and 64 QAM) and a coding rate, and a CQI having a higher index indicates a higher MCS (modulation and coding scheme) level. Accordingly, relative comparison of CQIs can be performed by comparing CQI indexes. That is, a higher CQI can be interpreted as a CQI having a higher index. In addition, since a CQI is calculated based on SINR, comparison of CQIs may be performed in such a manner that a subband having a high SINR is determined as a subband having a high CQI based on a result of comparison of SINRs of subbands.

When a CQI of a subband is not present or cannot be determined, CQIs of subbands may be compared on the assumption that a wideband CQI corresponds to the CQI of the subband.

It is assumed that the system bandwidth corresponds to 50 RBs in order to aid in understanding the present invention. Here, the size of a partition (or subband) can be determined as 6 RBs and 8 partitions (or subbands) can be configured within the system bandwidth. Indexes of the 8 subbands can be provided as subband 0 to subband 7 in increasing order of frequency. In addition, it is assumed that the first RB from among the 6 RBs included in one subband is set to an E-PDCCH allocatable region (refer to embodiment 1). Furthermore, it is assumed that a maximum of 2 E-CCEs can be transmitted in one RB (refer to FIG. 8). In this case, a total of 16 E-CCEs can be set in the 8 subbands and indexed by E-CCE 0 to E-CCE 15. This is arranged in Table 4.

TABLE 4

|  | Subband index | | | | | | | |
|---|---|---|---|---|---|---|---|---|
|  | 0 | 1 | 2 | 3 | 4 | 5 | 6 | 7 |
| E-CCE index | 0   1 | 2   3 | 4   5 | 6   7 | 8   9 | 10  11 | 12  13 | 14  15 |

It is assumed that the CQI of the second subband (i.e. subband 1) is higher than CQIs of other subbands when CQIs with respect to the 8 subbands are calculated and reported to the eNB. In this case, when a UE-specific E-PDCCH search space composed of 16 E-CCEs is configured, the UE-specific E-PDCCH search space can be set such that a search space with respect to each aggregation level is started at the third E-CCE (i.e. E-CCE 2). That is, the UE-specific E-PDCCH search space can be configured such that the UE-specific E-PDCCH search space preferentially includes E-CCE 2 and includes additional E-CCEs in increasing order of E-CCE index.

In this case, E-CCEs which constitute an E-PDCCH search space corresponding to each aggregation level can be determined according to Table 5.

TABLE 5

| Aggregation level | E-CCE index |
|---|---|
| 1 | {2}, {3}, {4}, {5}, {6}, {7} |
| 2 | {2, 3}, {4, 5}, {6, 7}, {8, 9}, {10, 11}, {12, 13} |
| 4 | {2, 3, 4, 5}, {6, 7, 8, 9} |
| 8 | {2, 3, 4, 5, 6, 7, 8, 9}, {10, 11, 12, 13, 14, 15, 0, 1} |

Table 5 is based on the assumption that a UE-specific search space is composed of 6, 6, 2 and 2 E-PDCCH candidates respectively for aggregation levels 1, 2, 4 and 8 for E-PDCCHs like a search space for the legacy PDCCH (refer to Table 2).

While E-CCEs are indexed in increasing order of frequency in the aforementioned embodiment, E-CCE indexes may be reallocated. For example, E-CCEs belonging to a subband having a higher CQI can be preferentially indexed. That is, it is possible to sort subband CQIs from the highest CQI, re-index E-CCEs belonging to each subband and then determine E-CCEs corresponding to each aggregation level in increasing order of E-CCE indexes (i.e. re-indexed indexes).

More specifically, it can be assumed that levels of the CQIs of the 8 subbands in the above example are as follows. CQI of subband 2>CQI of subband 0>CQI of subband 1>CQI of subband 3>CQI of subband 4>CQI of subband 5=CQI of subband 6=CQI of subband 7. That is, it can be assumed that the CQI of subband 2 is highest and subbands 5, 6 and 7 have the same CQI which is lowest. In this case, when the 16 E-CCEs are rearranged based on the levels of CQIs of subbands (Refer to Table 4) to which the E-CCEs belong, the E-CCEs are arranged in the order of E-CCE 4, E-CCE 5, E-CCE 0, E-CCE 1, E-CCE 2, E-CCE 3, E-CCE 6, E-CCE 7, E-CCE 8, E-CCE 9, E-CCE 10, E-CCE 11, E-CCE 12, E-CCE 13, E-CCE 14 and E-CCE 15. Indexes of the rearranged E-CCEs may be represented as E-CCE indexes. That is, the corresponding relationship between E-CCE indexes in increasing order of frequency and E-CCE indexes rearranged in the order of subband CQI are as shown in Table 6.

TABLE 6

| E-CCE index | | | | | | | | | | | | | | | | |
|---|---|---|---|---|---|---|---|---|---|---|---|---|---|---|---|---|
| | 4 | 5 | 0 | 1 | 2 | 3 | 6 | 7 | 8 | 9 | 10 | 11 | 12 | 13 | 14 | 15 |
| Ė-ĊĊĖ index | 0 | 1 | 2 | 3 | 4 | 5 | 6 | 7 | 8 | 9 | 10 | 11 | 12 | 13 | 14 | 15 |

In this case, when E-CCEs corresponding to a subband having a high CQI are preferentially included in the UE-specific E-PDCCH search space, E-CCEs constituting an E-PDCCH search space corresponding to each aggregation level can be represented as shown in Table 7.

TABLE 7

| Aggregation level | Ė-ĊĊĖ index |
|---|---|
| 1 | {0}, {1}, {2}, {3}, {4}, {5} |
| 2 | {0, 1}, {2, 3}, {4, 5}, {6, 7}, {8, 9}, {10, 11} |
| 4 | {0, 1, 2, 3}, {4, 5, 6, 7} |
| 8 | {0, 1, 2, 3, 4, 5, 6, 7}, {8, 9, 10, 11, 12, 13, 14, 15} |

E-PDCCH search spaces represented by E-CCEs indexes in Table 7 can be represented by E-CCE indexes, as shown Table 8.

TABLE 8

| Aggregation level | E-CCE index |
|---|---|
| 1 | {4}, {5}, {0}, {1}, {2}, {3} |
| 2 | {4, 5}, {0, 1}, {2, 3}, {6, 7}, {8, 9}, {10, 11} |
| 4 | {4, 5, 0, 1}, {2, 3, 6, 7} |
| 8 | {4, 5, 0, 1, 2, 3, 6, 7}, {8, 9, 10, 11, 12, 13, 14, 15} |

A resource region indicated by E-CCE indexes of Table 7 and a resource region indicated by E-CCE indexes of Table 8 have the same position on physical resources and are represented in different manners.

When the UE knows that E-CCEs preferentially included in the UE-specific E-PDCCH search space are determined based on the CQI of the corresponding subband, the UE may attempt to detect whether the E-PDCCH therefor is present in an E-PDCCH candidate position including E-CCEs (i.e. E-CCEs belonging to a subband having a high CQI) preferentially included in the search space in order to improve the efficiency of blind decoding performed thereby. In this case, complexity of E-PDCCH detection of the UE can be reduced and the E-PDCCH can be decoded rapidly and correctly.

Embodiment 3

Embodiment 3 relates to a method for signaling a region used for PDSCH transmission from among localized E-PDCCH allocation regions to a UE.

For example, while an E-PDCCH for the corresponding UE can be present in some of UE-specifically E-PDCCH allocatable regions (or E-PDCCH search spaces), the E-PDCCH may not be present in the remaining regions. Accordingly, the UE blind-decodes the E-PDCCH therefor in the E-PDCCH allocatable regions. When the UE detects the E-PDCCH therefor through blind decoding, the UE cannot be aware of whether E-PDCCH allocatable regions other than the region from which the E-PDCCH is detected are used to transmit E-PDCCHs of other UEs or used to transmit a PDSCH thereof.

For example, in the example of FIG. 11, UE1 can detect an E-PDCCH destined therefor in the first RB of subband N and be aware that subbands N and N+1 are allocated for PDSCH transmission for UE1 from DCI (e.g. downlink allocation information) included in the detected E-PDCCH. In this case, UE1 cannot be correctly aware of whether the first RB (i.e. the remaining E-PDCCH allocatable region) of subband N+1 is used to transmit an E-PDCCH of UE2 or used to transmit a PDSCH for UE1. If UE1 decodes the PDSCH on the assumption that the PDSCH is present in the first RB of subband N+1 even though the first RB of subband N+1 cannot be used to transmit PDSCH since the E-PDCCH for UE2 is present in the first RB of subband N+1 because UE1 does not know that the E-PDCCH of UE2 is present in the first RB of subband N+1, PDSCH decoding error may be generated. Similarly, when the first RB of subband N+1 is used to transmit the PDSCH for UE1, if UE1 decodes the PDSCH on the assumption that the PDSCH is not transmitted in the first RB of subband N+1, PDSCH decoding error may be generated.

Accordingly, to eliminate this ambiguity, control information (i.e. DCI) transmitted through an E-PDCCH may include information indicating whether an E-PDCCH of another UE is present in an E-PDCCH allocatable region. Here, UE2 corresponding to the other UE from the point of view of UE1 may be a UE which forms an MU-MIMO pair with UE1.

Embodiment 4

Embodiment 4 relates to a method for setting different aggregation levels for a localized E-PDCCH allocation region and a distributed E-PDCCH allocation region. Accordingly, a UE can blind-decode an E-PDCCH based on an aggregation level depending on E-PDCCH allocation scheme or allocation region type.

For example, in aperiodic CSI reporting mode 3-0 or 3-1 when the system bandwidth is 10 MHz (corresponding to approximately 55.6 RBs since one RB corresponds to 180 kHz), the size of a subband is 6 RBs and 9 subbands are present. In this case, an E-PDCCH allocatable region corresponding to 9 RBs can be set when the first RB of each subband is set as an E-PDCCH allocatable region as in embodiment 2.

When an aggregation level of 1, 2, 4 or 8 is applied to the localized allocation scheme, the size of an E-PDCCH allocatable resource region for all UEs (sharing specific resources) which are multiplexed in MU-MIMO is calculated as follows. If the size of one E-PDCCH resource is ¼ RBs (refer to FIG. 8), an aggregation level of 8 is applied and a maximum of 4 UEs can be multiplexed using layers respectively, then the size of a maximum E-PDCCH allocatable resource region for all UEs allocated in FDM is calculated as {¼*8*4}=8 RBs (i.e. ¼ RBs*aggregation level of 8*4 UEs).

When a resource region (in which UEs participating in MU-MIMO are multiplexed) shared by the UEs is set, the resource region may be set as one subband. In this case, the size of a resource allocated to each UE for MU-MIMO operation can be considered as 1 subband (=6 RBs).

The size of an E-PDCCH allocatable region (8 RBs in the aforementioned example) may exceed the size of a resource (6 RBs in the aforementioned example) allocated to each UE. That is, when a resource region allocated to each UE for MU-MIMO corresponds to 6 RBs while a maximum of 8 RBs is necessary for actual E-PDCCH allocation, E-PDCCH transmission may not be correctly supported.

In addition, a localized-allocated E-PDCCH can obtain beam gain together with scheduling gain for bandwidth selection, compared to a distributed-allocated E-PDCCH and thus there is high possibility that the localized-allocated E-PDCCH operates at a high SINR (or high MCS level). Accordingly, since it can be expected a high aggregation level is not needed for E-PDCCH allocation in many cases, it may not be necessary to define a high aggregation level for the localized-allocated E-PDCCH.

Therefore, the present invention proposes application of a lower aggregation level to the localized-allocated E-PDCCH than the distributed-allocated E-PDCCH. For example, an aggregation level of 1, 2, 4 or 8 is set for the distributed-allocated E-PDCCH and the aggregation level for the localized-allocated E-PDCCH is limited to 1, 2 or 4.

Figure 12:
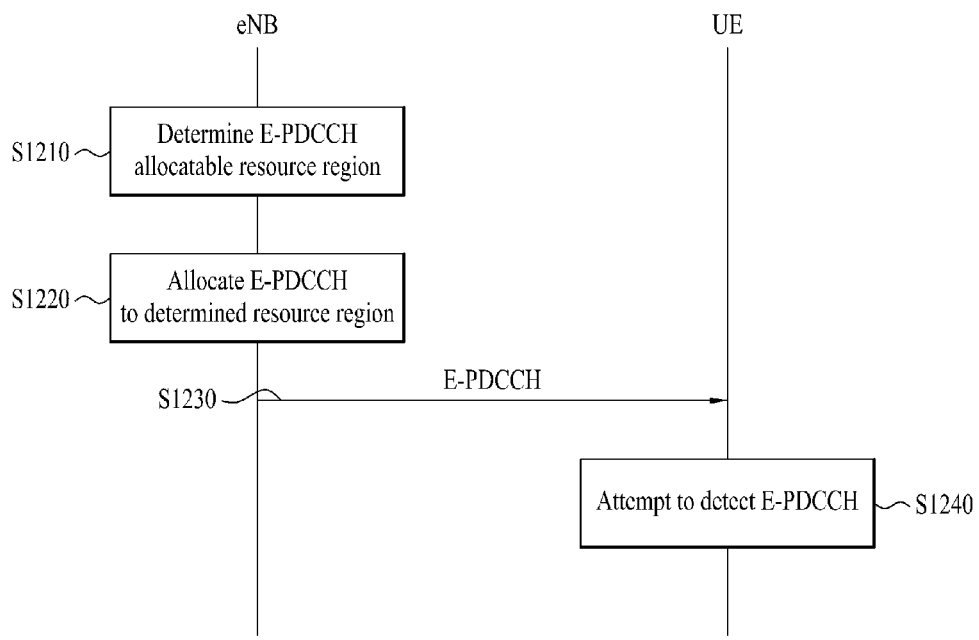
FIG. 12 is a flowchart illustrating a method for transmitting and receiving downlink control information through an E-PDCCH according to an embodiment of the present invention.

FIG. 12 is a flowchart illustrating a method for transmitting and receiving downlink control information through an E-PDCCH according to an embodiment of the present invention.

An eNB may determine an E-PDCCH allocatable resource region in step S1210. Here, when the downlink system bandwidth includes a plurality of partitions as in embodiments 1 and 2, a localized E-PDCCH allocatable resource region may be set as a group of partial resource regions in the respective partitions. The group of partial resource regions can be set in consideration of priority (e.g. channel quality factor) of the partitions. For example, a partition corresponds to a subband and part of the resource region of one subband may be set as resource blocks or E-CCEs. For example, E-CCEs belonging to a subband having high channel quality can be preferentially set as the E-PDCCH allocatable resource region.

In step S1220, the eNB may allocate E-PDCCHs to the E-PDCCH allocatable resource region determined in step S1210.

The eNB may transmit downlink control information (e.g. downlink allocation or uplink grant information) to a UE through the allocated E-PDCCHs in step S1230.

The UE may attempt to detect an E-PDCCH destined therefor in step S1240. For example, the UE can be previously provided with configuration information on the E-PDCCH allocatable resource region from the eNB and perform blind decoding to detect whether the E-PDCCH destined therefor is present in the E-PDCCH allocatable resource region. When the UE has successfully decoded the E-PDCCH, the UE can acquire the downlink control information through the E-PDCCH.

The above-described embodiments of the present invention can be independently applied or two or more embodiments can be simultaneously applied and description of redundant parts is omitted for clarity.

In description of the various embodiment of the present invention, an eNB is exemplified as a downlink transmission entity and a UE is exemplified as a downlink reception entity. However, the scope of the present invention is not limited thereto. That is, the principle of the present invention, described through the various embodiments, can be equally applied to a case in which a relay is a downlink transmission entity for performing transmission to a UE or an uplink reception entity for performing reception from the UE or a case in which a relay is an uplink transmission entity for performing transmission to an eNB or a downlink reception entity for performing reception from the eNB.

Figure 13:
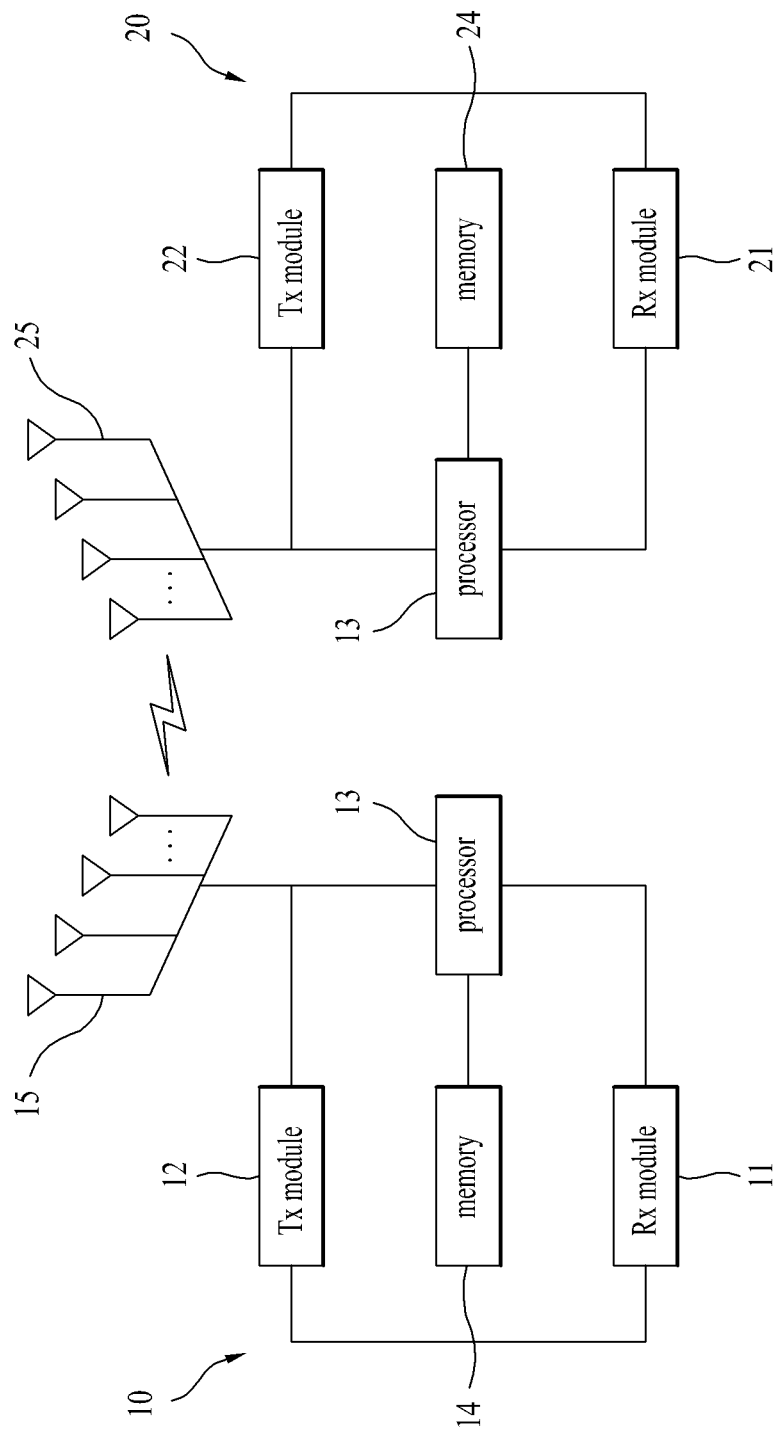
FIG. 13 illustrates configurations of a downlink transmitter and a downlink receiver according to an embodiment of the present invention.

FIG. 13 illustrates configurations of a downlink transmitter and a downlink receiver according to an embodiment of the present invention.

Referring to FIG. 13, the downlink transmitter 10 according to an embodiment of the present invention may include a reception module 11, a transmission module 12, a processor 13, a memory 14 and a plurality of antennas 15. The plurality of antennas refers to a downlink transmitter supporting MIMO transmission/reception. The reception module 11 may receive signals, data and information on uplink from the downlink receiver 20. The transmission module 12 may transmit signals, data and information on downlink to the downlink receiver 20. The processor 13 may control overall operation of the downlink transmitter 10.

The downlink transmitter 10 according to an embodiment of the present invention may be configured to transmit downlink control information through E-PDCCHs. The processor 13 may be configured to determine a resource region to which E-PDCCHs can be allocated according to localized allocation and allocate E-PDCCHs to the determined resource region. In addition, the processor 13 may be configured to transmit downlink control information on the allocated E-PDCCHs using the transmission module 12. Here, when a downlink system bandwidth includes a plurality of partitions, the E-PDCCH allocatable resource region may be set as a set of parts of resource regions of the respective partitions. The aforementioned embodiments are applied to set the E-PDCCH allocatable resource region.

The processor 13 of the downlink transmitter 10 may process information received by the downlink transmitter 10, information transmitted from the downlink transmitter 10 to the outside, etc. The memory 14 may store processed information for a predetermined time and may be replaced by a component such as a buffer (not shown).

Referring to FIG. 13, the downlink receiver 20 according to an embodiment of the present invention may include a reception module 21, a transmission module 22, a processor 23, a memory 24 and a plurality of antennas 25. The plurality of antennas 25 refers to a downlink receiver supporting MIMO transmission/reception. The reception module 21 may receive signals, data and information from the downlink transmitter 10 and the transmission module 22 may transmit signals, data and information to the downlink transmitter 10. The processor 23 may control overall operation of the downlink receiver 20.

The downlink receiver 20 according to an embodiment of the present invention may be configured to receive downlink control information through an E-PDCCH. The processor 23 may be configured to determine a resource region to which E-PDCCHs can be allocated according to localized allocation and to attempt to decode an E-PDCCH for the downlink receiver 20. In addition, the processor 23 may be configured to receive the downlink control information transmitted on the E-PDCCH through the reception module 21 when the E-PDCCH has been successfully decoded. Here, when the downlink system bandwidth includes a plurality of partitions, the E-PDCCH allocatable resource region may be set as a set of parts of resource regions of the respective partitions. The aforementioned embodiments are applied to set the E-PDCCH allocatable resource region.

The processor 23 of the downlink receiver 20 may process information received by the downlink receiver 20, information transmitted from the downlink receiver 20 to the outside, etc. The memory 24 may store processed information for a predetermined time and may be replaced by a component such as a buffer (not shown).

In the aforementioned configurations of the downlink transmitter 10 and the downlink receiver 20, the above-described various embodiments of the present invention are independently applicable or two or more thereof are simultaneously applicable and redundant description is omitted for clarity.

The above description of the downlink transmitter 10 of FIG. 13 may be equally applied to a relay corresponding to a downlink transmitting entity or an uplink reception entity and the description of the downlink receiver 20 of FIG. 13 may be equally applied to a relay corresponding to a downlink reception entity or an uplink transmission entity.

The embodiments of the present invention may be achieved by various means, for example, hardware, firmware, software, or a combination thereof In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit data to and receive data from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention is not intended to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by subsequent amendment after the application is filed.

INDUSTRIAL APPLICABILITY

The above-described embodiments of the present invention are applicable to various mobile communication systems.

The invention claimed is:

1. A method for an evolved Node B (eNB) transmitting downlink control information in a wireless communication system, the method comprising:
   determining a localized enhanced physical downlink control channel (E-PDCCH) allocatable resource region;
   allocating a first E-PDCCH of a first user equipment (UE) to a first resource region included in the determined localized E-PDCCH allocatable resource region; and
   transmitting the downlink control information to the first UE on the first E-PDCCH,
   wherein the determined localized E-PDCCH allocatable resource region is set as a group of partial resource regions in corresponding partitions when a downlink system bandwidth includes a plurality of partitions,
   wherein the downlink control information includes information indicating that a physical downlink shared channel (PDSCH) of the first UE is allocated to a second resource region in the determined localized E-PDCCH allocatable resource region and information indicating whether a second E-PDCCH of a second UE instead of the PDSCH of the first UE is present in the second resource region,
   wherein an aggregation level for the first E-PDCCH is set higher than 4 when the first E-PDCCH is allocated according to distributed allocation, and
   wherein the aggregation level for the first E-PDCCH is set equal to or lower than 4 when the first E-PDCCH is allocated according to localized allocation.

2. The method according to claim 1, wherein the group of partial resource regions is determined according to predetermined priority of the plurality of partitions.

3. The method according to claim 2, wherein the predetermined priority is set according to channel quality of the plurality of partitions.

4. The method according to claim 3, wherein priority of the plurality of partitions is assigned according to channel quality.

5. The method according to claim 1, wherein:
the plurality of partitions corresponds to a plurality of subbands; and
at least one of the plurality of subbands includes a plurality of resource blocks.

6. The method according to claim 5, wherein the group of partial resource regions includes resource blocks having lowest indexes in the corresponding plurality of subbands.

7. The method according to claim 6, wherein each of a plurality of resource blocks belonging to the localized E-PDCCH allocatable resource region includes a plurality of enhanced-control channel elements (E-CCEs).

8. The method according to claim 5, wherein the localized E-PDCCH allocatable resource region is set to include enhanced-control channel elements (E-CCEs) belonging to a subband having high channel quality.

9. The method according to claim 1, wherein configuration information related to at least the plurality of partitions or the group of partial resource regions is provided to an entity receiving the first E-PDCCH via higher layer signaling.

10. The method according to claim 1, wherein the first E-PDCCH is located on orthogonal frequency division multiplex (OFDM) symbols other than a first four OFDM symbols in a downlink subframe.

11. A method for a first user equipment (UE) receiving downlink control information in a wireless communication system, the method comprising:
determining a localized enhanced physical downlink control channel (E-PDCCH) allocatable resource region;
attempting to decode a first E-PDCCH of the first UE in a first resource region included in the determined localized E-PDCCH allocatable resource region; and
receiving the downlink control information transmitted from an eNB (e Node-B) on the first E-PDCCH when the first E-PDCCH has been successfully decoded,
wherein the determined localized E-PDCCH allocatable resource region is set as a group of partial resource regions in corresponding partitions when a downlink system bandwidth includes a plurality of partitions,
wherein the downlink control information includes information indicating that a physical downlink shared channel (PDSCH) of the first UE is allocated to a second resource region in the determined localized E-PDCCH allocatable resource region and information indicating whether a second E-PDCCH of a second UE instead of the PDSCH of the first UE is present in the second resource region,
wherein an aggregation level for the first E-PDCCH is set higher than 4 when the first E-PDCCH is allocated according to distributed allocation, and
wherein the aggregation level for the first E-PDCCH is set equal to or lower than 4 when the first E-PDCCH is allocated according to localized allocation.

12. An evolved Node B (eNB) transmitting downlink control information in a wireless communication system, the eNB comprising:
a reception module configured to receive information;
a transmission module configured to transmit information; and
a processor configured to:
determine a localized E-PDCCH allocatable resource region;
allocate a first E-PDCCH of a first user equipment (UE) to a first resource region included in the determined localized E-PDCCH allocatable resource region; and
control the transmission module to transmit the downlink control information to the first UE on the first E-PDCCH,
wherein the determined localized E-PDCCH allocatable resource region is set as a group of partial resource regions in corresponding partitions when a downlink system bandwidth includes a plurality of partitions,
wherein the downlink control information includes information indicating that a physical downlink shared channel (PDSCH) of the first UE is allocated to a second resource region in the determined localized E-PDCCH allocatable resource region and information indicating whether a second E-PDCCH of a second UE instead of the PDSCH of the first UE is present in the second resource region,
wherein an aggregation level for the first E-PDCCH is set higher than 4 when the first E-PDCCH is allocated according to distributed allocation, and
wherein the aggregation level for the first E-PDCCH is set equal to or lower than 4 when the first E-PDCCH is allocated according to localized allocation.

13. A first user equipment (UE) receiving downlink control information in a wireless communication system, the first UE comprising:
a reception module configured to receive information;
a transmission module configured to transmit information; and
a processor configured to:
determine a localized enhanced physical downlink control channel (E-PDCCH) allocatable resource region;
attempt to decode a first E-PDCCH of the first UE in a first resource region included in the determined localized E-PDCCH allocatable resource region; and
control the reception module to receive the downlink control information transmitted from an eNB (e Node-B) on the first E-PDCCH when the first E-PDCCH has been successfully decoded,
wherein the determined localized E-PDCCH allocatable resource region is set as a group of partial resource regions in corresponding partitions when a downlink system bandwidth includes a plurality of partitions,
wherein the downlink control information includes information indicating that a physical downlink shared channel (PDSCH) of the first UE is allocated to a second resource region in the determined localized E-PDCCH allocatable resource region and information indicating whether a second E-PDCCH of a second UE instead of the PDSCH of the first UE is present in the second resource region,
wherein an aggregation level for the first E-PDCCH is set higher than 4 when the first E-PDCCH is allocated according to distributed allocation, and
wherein the aggregation level for the first E-PDCCH is set equal to or lower than 4 when the first E-PDCCH is allocated according to localized allocation.

14. The method according to claim 11, wherein:
the group of partial resource regions is determined according to predetermined priority of the plurality of partitions; and
the predetermined priority is set according to channel quality of the plurality of partitions.

15. The method according to claim 14, wherein priority of the plurality of partitions is assigned according to channel quality.

16. The method according to claim 11, wherein:
the plurality of partitions corresponds to a plurality of subbands;

at least one of the plurality of subbands includes a plurality of resource blocks; and the group of partial resource regions includes resource blocks having lowest indexes in the corresponding subbands.

17. The method according to claim 16, wherein each of a plurality of resource blocks belonging to the localized E-PDCCH allocatable resource region includes a plurality of enhanced-control channel elements (E-CCEs).

18. The method according to claim 16, wherein the localized E-PDCCH allocatable resource region is set to include enhanced-control channel elements (E-CCEs) belonging to a subband having high channel quality.

19. The method according to claim 11, wherein configuration information related to at least the plurality of partitions or the group of partial resource regions is provided to an entity receiving the first E-PDCCH via higher layer signaling.

20. The method according to claim 11, wherein the first E-PDCCH is located on orthogonal frequency division multiplex (OFDM) symbols other than a first four OFDM symbols in a downlink subframe.

* * * * *